United States Patent
Konya et al.

(10) Patent No.: US 12,165,392 B2
(45) Date of Patent: Dec. 10, 2024

(54) ESTIMATION PROGRAM, ESTIMATION DEVICE, GENERATION METHOD OF DETECTION MODEL, LEARNING METHOD, AND LEARNING DEVICE

(71) Applicant: NIPPON TELEGRAPH AND TELEPHONE CORPORATION, Tokyo (JP)

(72) Inventors: Seiichi Konya, Musashino (JP); Satoshi Sakuma, Musashino (JP); Taiji Nakamura, Musashino (JP); Yukihiro Nakamura, Musashino (JP); Tatsuaki Ito, Musashino (JP); Takuya Murayama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 382 days.

(21) Appl. No.: 17/635,701

(22) PCT Filed: Aug. 20, 2019

(86) PCT No.: PCT/JP2019/032491
§ 371 (c)(1),
(2) Date: Feb. 16, 2022

(87) PCT Pub. No.: WO2021/033273
PCT Pub. Date: Feb. 5, 2021

(65) Prior Publication Data
US 2022/0284702 A1     Sep. 8, 2022

(51) Int. Cl.
*G06V 10/771*   (2022.01)
*G06N 3/08*   (2023.01)
(Continued)

(52) U.S. Cl.
CPC ............. *G06V 10/776* (2022.01); *G06N 3/08* (2013.01); *G06V 10/771* (2022.01); *G06V 10/80* (2022.01); *G06V 10/82* (2022.01); *G06V 20/70* (2022.01)

(58) Field of Classification Search
CPC .................................................. G06V 10/771
See application file for complete search history.

(56) References Cited

U.S. PATENT DOCUMENTS

2018/0203571 A1* 7/2018 Dayanandan ............. G06F 8/38
2019/0325265 A1* 10/2019 Lecue ................. G06N 3/0464
(Continued)

FOREIGN PATENT DOCUMENTS

JP     2014093023 A     5/2014
JP     2015001966 A     1/2015

OTHER PUBLICATIONS

Oct. 15, 2019, International Search Report issued in the International Patent Application No. PCT/JP2019/032491.
(Continued)

*Primary Examiner* — Di Xiao
(74) *Attorney, Agent, or Firm* — XSENSUS LLP

(57) ABSTRACT

An estimation program causing a computer to execute a step (S104) of acquiring a learned detection model and a constituent component model, a step (S202) of outputting constituent component detection results based on the new image using the learned detection model, a step (S203) of estimating first primary component candidates based on the constituent component model and the constituent component detection results and sorting out a secondary component not registered with a list of the first primary component candidates, a step (S204) of merging a plurality of the first primary component candidates to generate a second primary component candidate, and a step (S205) of selecting a secondary component matching the second primary compo-
(Continued)

nent candidate from among a plurality of secondary components sorted out and registering the selected secondary component with the second primary component candidate.

18 Claims, 25 Drawing Sheets

(51) Int. Cl.
*G06V 10/776* (2022.01)
*G06V 10/80* (2022.01)
*G06V 10/82* (2022.01)
*G06V 20/70* (2022.01)

(56) References Cited

U.S. PATENT DOCUMENTS

2020/0159647 A1* 5/2020 Puszkiewicz ....... G06F 11/3664
2022/0413997 A1* 12/2022 Shi .......................... G06N 20/00

OTHER PUBLICATIONS

Wei Liu et al., SSD: Single Shot MultiBox Detector, Computer Vision—ECCV 2016, 2016, pp. 21-37.

* cited by examiner

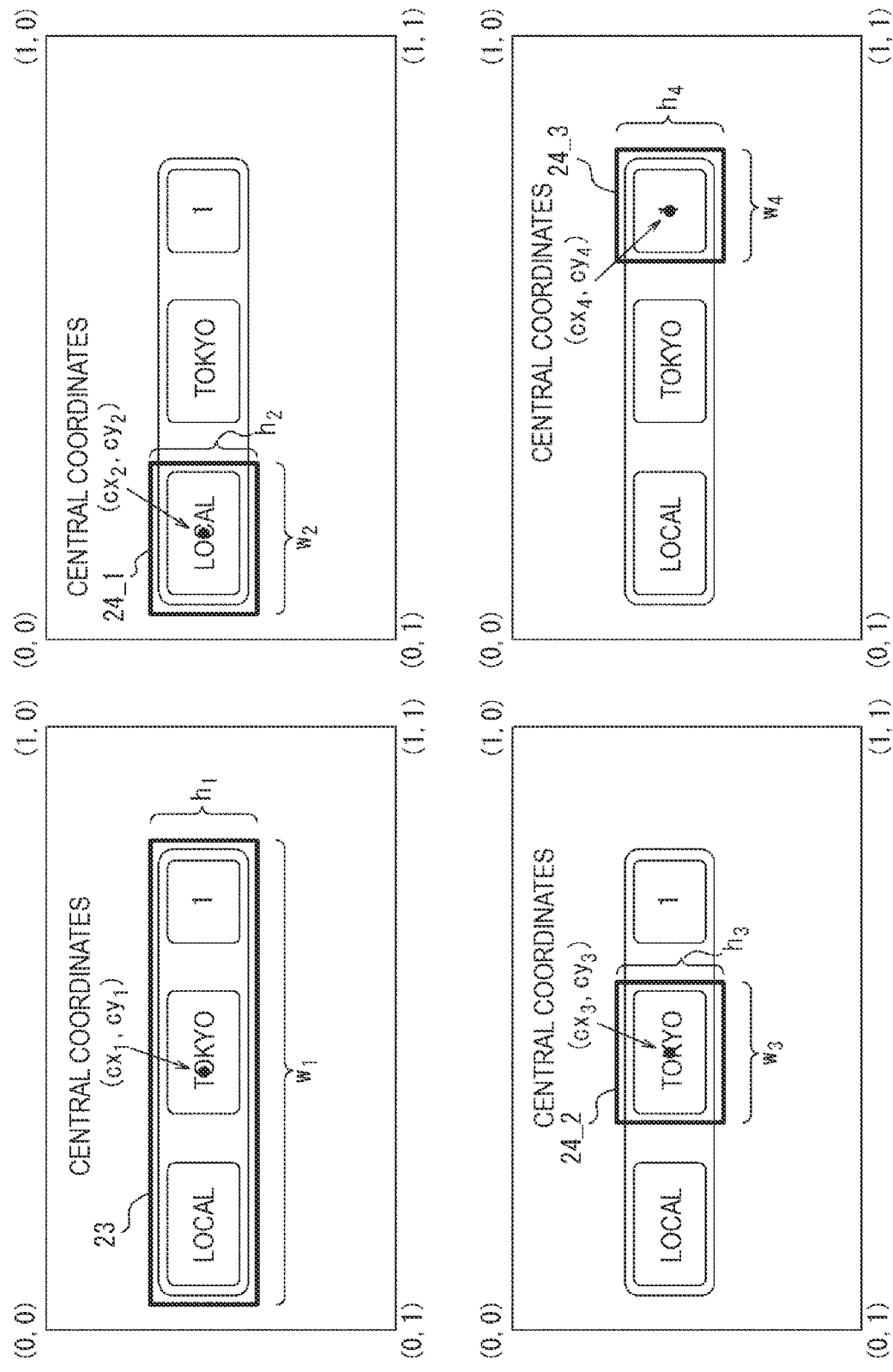

FIG. 5

Algorithm 1 constituent component modeling algorithm

Input: annotation data, the number of patterns $P$
    Output: constituent pattern list $(pcx_p^{(g)}, pcy_p^{(g)}, pw_p^{(g)}, ph_p^{(g)})$, $g \in$ {destination display, type, destination, platform}, $p = 1, \cdots, P$
    regular constituent object list = create regular constituent object list (annotation data)
    for all regular constituent objects $i$ do
      //normalize coordinates of region using region of destination display
      for $g \in$ {destination display, type, destination, platform} do

$$ncx_i^{(g)} = \frac{cx_i^{(g)} - cx_i^{\text{destination display}}}{w_i^{\text{destination display}}} + \frac{1}{2}$$

$$ncy_i^{(g)} = \frac{cy_i^{(g)} - cy_i^{\text{destination display}}}{h_i^{\text{destination display}}} + \frac{1}{2}$$

$$nw_i^{(g)} = \frac{w_i^{(g)}}{w_i^{\text{destination display}}}$$

$$nh_i^{(g)} = \frac{h_i^{(g)}}{h_i^{\text{destination display}}}$$

//calculate tilt from center of regions of type and platform $$\Theta_i = \tan^{-1} \frac{ncy_i^{\text{platform}} - ncy_i^{\text{type}}}{ncx_i^{\text{platform}} - ncx_i^{\text{type}}}$$

//divide range of tilts into $P$ $$\Theta_{max} = \text{argmax}_i \Theta_i$$
$$\Theta_{min} = \text{argmin}_i \Theta_i$$
$$\Delta\Theta = \frac{\Theta_{max} - \Theta_{min}}{P}$$

//calculate average of regions per $P$ ranges to form constituent pattern
    for $p$ to $P$ do

$$I_p = \{i | \lfloor \frac{\Theta_i - \Theta_{min}}{\Delta\Theta} \rfloor = p\}$$

for $g \in$ {destination display, type, destination, platform} do

$$pcx_p^{(g)} = E[ncx_i^{(g)} | i \in I_p]$$
$$pcy_p^{(g)} = E[ncy_i^{(g)} | i \in I_p]$$
$$pw_p^{(g)} = E[nw_i^{(g)} | i \in I_p]$$
$$ph_p^{(g)} = E[nh_i^{(g)} | i \in I_p]$$

here, $E[\cdot]$ is average value
    procedure, create regular constituent object list

Procedure create regular constituent object list (annotation data)
        list = [ ] //create null list
        index = array of the number of pieces of annotation data
        //create item creation of primary component
        $j = 0$
        for all annotation data $i$ do
          if label of $i$ = destination display then
            list += {destination display: $i$ region, type: null, destination: null, platform: null}
            index [$i$] = $j$
            $j$ += 1
        //register item of secondary component
        for all annotation data $i$ do
          if label of $i \neq$ destination display then
            primary component number of $k = i$
            group name of $g = i$
            list [index [$k$]][$g$] = $i$ region
        return list

FIG. 10

```
Algorithm 2 bottom-up estimation algorithm
  Input: constituent component list part_i (i = 1, ···, N), constituent component pattern list,
  primary component adoption threshold, candidate creation threshold, candidate adoption threshold
  Output: primary component list, secondary component candidate list
  for i = 1 to N do
    if label of part_i = destination display then
      if score of part_i > primary component adoption threshold then
        primary component candidate list += {destination guide: part_i, type: null, destination: null, platform: null}
      continue
    if score of part_i < candidate creation threshold then
      secondary component list += part_i
      continue
    for p ∈ constituent component pattern list do
      score_p = 0
      //estimate region of regular constituent object based on constituent component pattern p
      regular constituent object region_p = regular constituent object region estimation (part_i, p)
      for j to N and j≠i do
        group name of dg=part_j //search Table 3 for label name
        //calculate IoU between regular constituent object region_p and part_j
        IoU=calIoU (region of regular constituent object region^{dg}_p and part_j)
        score_p += score of IoU × part_j
      if p = argmax_p (score_p) and score_p ≥ candidate adoption threshold then
        candidate component list += {destination guide: (regular constituent object region^{destination display}_p, null,
  score of part_i), group of part_j : part_j}
    else
      secondary component list += part_i
  procedure, regular constituent object region estimation
    Procedure regular constituent object region estimation (constituent component, constituent component pattern p)
    dcx, dcy, dw, dh = region of constituent component
    dg =group name of constituent component //search Table 3 for label name
    scale_x = dw / pw^{dg}_p
    scale_y = dh / ph^{dg}_p
    for g ∈ {destination display, type, destination, platform} do
      pcx^g_p, pcy^g_p, pw^g_p, ph^g_p = region of group g of constituent component pattern p
      cx^g = scale_x · (pcx^g_p − pcx^{dg}_p) + dcx
      cy^g = scale_y · (pcy^g_p − pcy^{dg}_p) + dcy
      w^g = scale_x · pw^g_p
      h^g = scale_y · ph^g_p
    return (cx^g, cy^g, w^g, h^g), g ∈ {destination display, type, destination, platform}
  procedure calIoU
    Procedure calIoU (region_1, region_2)
    for i=1 to 2 do
      (cx_i, cy_i, w_i, h_i)=region_i
      xmin_i = cx_i − w_i/2
      ymin_i = cy_i − h_i/2
      xmax_i = cx_i + w_i/2
      ymax_i = cy_i + h_i/2
    intersect_w = max(min(xmax_1, xmax_2) − max(xmin_1, xmin_2), 0)
    intersect_h = max(min(ymax_1, ymax_2) − max(ymin_1, ymin_2), 0)
    intersect = intersect_w · intersect_h
    union = w_1·h_1 + w_2·h_2 − intersect
    return intersect / union
```

FIG. 11

```
Algorithm 3 primary component merge algorithm
    Input: primary component candidate list, candidate merge threshold
    Output: primary component list
    primary component list = primary component candidate list
    while true
    if |primary component list| ≤ 1 then end
    for all sets of primary components (i, j) do
        IoU_{i,j} = calIoU (primary component^{destination guide}_i region, primary component^{destination guide}_j region)
    (s,t)=argmax_{(i,j)} IoU_{i,j}
    if IoU_{s,t} ≥ candidate merge threshold then
        primary component_i = primary component integration (primary component_i, primary component_j)
        delete primary component_j
    else end procedure, merger primary components
    Procedure merge primary components (primary component_1, primary component_2)
        integrated score = score of primary component^{destination display}_1 + score of primary component^{destination display}_2
        integrated region =
        score of primary component^{destination display}_1, score of region of primary component^{destination display}_1 +
        primary component^{destination display}_2 and region of primary component^{destination display}_2
                                                                                                integrated score
        If label of primary component^{destination display}_1 ≠ null then
            integrated label = label of primary component^{destination display}_1
        else
            integrated label = label of primary component^{destination display}_2
        primary component^{destination display}_1 = (integrated region, integrated label, integrated score)
        for g ∈ {type, destination, platform} do
            if primary component^g_1 ≠ null or primary component^g_2 ≠ null then
                k = argmax_i score of primary component^g_i
                primary component^g_1 = primary component^g_k
        return primary component_i
```

FIG. 12

Algorithm 4 top-down recognition algorithm
    Input: primary component list, secondary component list, secondary component selection threshold
    Output: recognition result
    for all secondary components$_j$ do
        g = group name of secondary component$_j$
        for all primary components$_i$ do
            matching ratio$_i$ = matching ratio calculation (primary component$_i$, secondary component$_j$)
        k =argmax$_i$ matching ratio$_i$
        if matching ratio$_k$ < secondary component selection threshold then continue
        if score of secondary component$_j$ ≤ score of primary component$^g{}_k$ then
            // register secondary component$_j$ with primary component$_i$
            primary component$^g{}_i$ = secondary component$_j$
    for all primary components$_i$ do
        if the number of secondary components belonging to primary component$_i$ = 0 then
            delete primary component$_i$
    recognition result = primary component list procedure, matching ratio calculation
    Procedure matching ratio calculation (primary component, secondary component)
    $(cx_u, cy_u, w_u, h_u)$= region of destination display group of primary component
    $(cx_l, cy_l, w_l, h_l)$= region of secondary component
    $S = w_l \cdot h_l$
    $x_0 = \max(cx_l - \frac{1}{2}w_l, cx_u - \frac{1}{2}w_u)$
    $x_1 = \min(cx_l + \frac{1}{2}w_l, cx_u + \frac{1}{2}w_u)$
    $y_0 = \max(cy_l - \frac{1}{2}w_l, cy_u - \frac{1}{2}w_u)$
    $y_1 = \min(cy_l + \frac{1}{2}w_l, cy_u + \frac{1}{2}w_u)$
    return $(\max(0, x_1 - x_0) \cdot \max(0, y_1 - y_0))/S$

FIG. 14

Algorithm 5 tilt calculation 2

Input: $(cx_i, cy_i), i=1, \cdots, N$
  Output: $\Theta$
  $\mathbf{p}_i = (cx_i, cy_i), i=1, \cdots, N$ $$\mu = \frac{1}{N} \sum_{i=1}^{N} \mathbf{p}_i$$

$$\begin{pmatrix} \sigma_x & \sigma_{xy} \\ \sigma_{xy} & \sigma_y \end{pmatrix} = \frac{1}{N} \sum_{i=1}^{N} (\mathbf{p}_i - \mu)^T (\mathbf{p}_i - \mu)$$

$$\lambda = \frac{1}{2} \left\{ \sigma_x + \sigma_y + \sqrt{(\sigma_x + \sigma_y)^2 - 4(\sigma_x \sigma_y - \sigma_{xy}^2)} \right\}$$

$$\Theta = \begin{cases} \tan^{-1} \dfrac{\lambda - \sigma_x}{\sigma_{xy}} & \text{if } \lambda - \sigma_x \neq 0 \land \sigma_{xy} \neq 0 \\ \tan^{-1} \dfrac{\sigma_{xy}}{\lambda - \sigma_y} & \text{otherwise} \end{cases}$$

FIG. 15

Algorithm 6 k-means clustering
  Input: data $y_i$, ($i = 1, \cdots, n$), the number of clusters $k$, and the number of repetitions $T$
  Output: cluster center $c_j$, ($j = 1, \cdots, k$), cluster index $g_i$, ($i = 1, \cdots, n$)
  randomly initialize cluster center $c_j$, ($j = 1, \cdots, k$)
  for $t=1$ to $T$ do
  $$g_i = \mathrm{argmin}_{j \in \{1,\cdots,k\}} \|y_i - c_j\|$$
  $$c_j = \frac{\sum_{i=1}^{n} [\![g_i = j]\!] y_i}{\sum_{i=1}^{n} [\![g_i = j]\!]}, \quad (j=1,\cdots,k)$$

here, $[\![\text{condition}]\!] = \begin{cases} 1 & \text{condition is true} \\ 0 & \text{otherwise} \end{cases}$

FIG. 16

Algorithm 7 top-down recognition Algorithm 2
　Input: primary component list, secondary component list, secondary component selection threshold,
　　　constituent component pattern list
　Output: recognition result
　//estimate optimal constituent object region of primary component
　for all primary components$_i$ do
　　for $p \in$ constituent component pattern list do
　　　score$_p$ = 0
　　　constituent object region$_{i,p}$ = constituent object region estimation
　　　(primary component$_i$, constituent pattern $p$)
　　　//determine constituent pattern
　　　for $g \in$ {type, destination, platform} do
　　　　if primary component$^g_i \neq$ null then score$_p$ += IoU (constituent object region $_{i,p}$, primary component$^g_i$)
　　　for all secondary components$_j$ do
　　　　score$_p$ += IoU (constituent object region $_{i,p}$, secondary component$_j$)
　　$q$=argmax$_p$ (score$_p$)
　　optimal constituent object region$_i$ =constituent object region$_{i,q}$ for all secondary components$_j$ do
　　$g$ = group name of secondary component$_j$
　　for all primary component$_i$ do
　　　matching ratio$_i$ = matching ratio calculation 2 (optimal constituent object region$^g_i$, secondary component$_j$)
　　$k$ = argmax$_i$ matching ratio$_i$
　　if matching ratio$_k$ < secondary component selection threshold then continue
　　if score of secondary component$_j$ ≤ score of primary component$^g_k$ then
　　　// register secondary component$_j$ with primary component$_i$
　　　primary component$^g_i$ = secondary component$_j$ for all primary components$_i$ do
　　if the number of secondary components belonging to primary component$_i$ = 0 then
　　　delete primary component$_i$ recognition result = primary component list
　procedure, constituent object region estimation
　　　Procedure constituent object region estimation (primary component, constituent pattern)
　　　$(cx, cy, w, h)$= primary component$^{regular\ object}$
　　　$(pcx^g, pcy^g, pw^g, ph^g)$=constituent pattern
　　　for $g \in$ {destination display, type, destination, platform} do
　　　　$ecx^g = w \cdot (pcx^g - \frac{1}{2}) + cx$
　　　　$ecy^g = h \cdot (pcy^g - \frac{1}{2}) + cy$
　　　　$ew^g = w \cdot pw^g$
　　　　$eh^g = h \cdot ph^g$
　　　　return $(ecx^g, ecy^g, ew^g, eh^g)$
　procedure, matching ratio calculation 2
　　　Procedure matching ratio calculation 2 (region$_1$, region$_2$)
　　　$(cx_1, cy_1, w_1, h_1)$=region$_1$
　　　$(cx_2, cy_2, w_2, h_2)$=region$_2$
　　　return $\frac{|cx_1 - cx_2|}{w_1} + \frac{|cy_1 - cy_2|}{h_1} + \frac{|w_1 - w_2|}{w_1} + \frac{|h_1 - h_2|}{h_1}$ FIG. 24
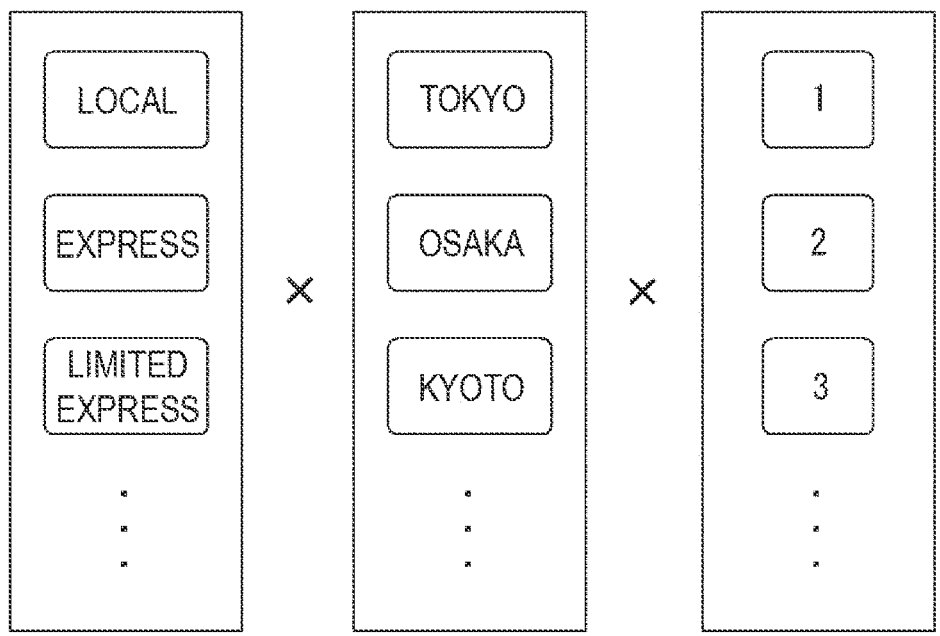
LEARN ALL COMBINATIONS
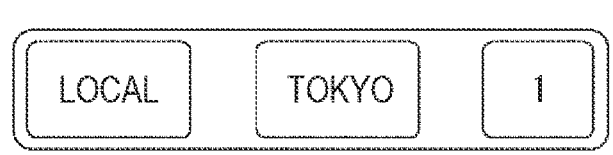
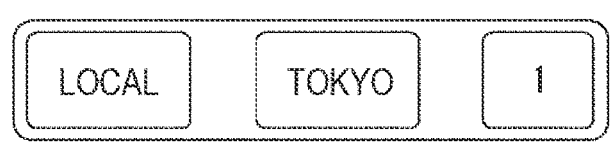
TRAINING DATA INCREASES EXPONENTIALLY

ESTIMATION PROGRAM, ESTIMATION DEVICE, GENERATION METHOD OF DETECTION MODEL, LEARNING METHOD, AND LEARNING DEVICE

TECHNICAL FIELD

The present disclosure relates to an estimation program, an estimation apparatus, a generating method of a detection model, a learning method, and a learning apparatus.

BACKGROUND ART

Conventionally, object recognition methods such as a Single Shot MultiBox Detector (SSD) described in NPL 1 is known. The SSD defines labels (e.g., "human", "car") of a plurality of objects as recognition targets in advance, obtains training data by clipping labels and coordinates of regions of the plurality of objects from a training image as illustrated in in FIG. 17, and learns with a neural network using a large amount of training data (e.g., about 100 to 1000 training images per label). For recognition, when a new image as illustrated in FIG. 18, is input into the neural network, labels of a plurality of objects, regions of the plurality of objects, and scores of the plurality of objects included in the new image are detected.

CITATION LIST

Non Patent Literature

NPL 1: Wei Liu, et al., "SSD: Single Shot MultiBox Detector"; Computer Vision—ECCV 2016, pp. 21-37, [online], 2016, [Search on Jul. 22, 2019], Internet <URL: https://arxiv.org/abs/1512.02325>

SUMMARY OF THE INVENTION

Technical Problem

Examples of a method for recognizing components contained in a regular constituent object as illustrated in FIG. 20 from a new image as illustrated in FIG. 19 include two object recognition methods below.

In a first object recognition method, a training image as illustrated in FIG. 21 is used to detect individual components contained in a plurality of regular constituent objects, and then, combinations of the components are determined.

However, in the first object recognition method, as illustrated in FIG. 22, the plurality of regular constituent objects are contained in the training image, and if the training image is tilted, for example, a wrong combination may be disadvantageously learned. In addition, as illustrated in FIG. 23, components that are not contained in a regular constituent object (for example, "Tokyo", "2") are erroneously recognized disadvantageously.

In a second object recognition method, as illustrated in FIG. 24, training data of all combinations of components is created in advance to perform learning and recognition.

However, in the second object recognition method, in a case of a large number of combinations of the components, the number of pieces of training data is a large number and learning of the neural network is disadvantaged due to difficulty. Furthermore, in a case that the components to be combined have differences in a size, color, shape, and the like, erroneous recognitions are increased disadvantageously.

An object of the present disclosure made in light of the foregoing is to provide an estimation program, an estimation apparatus, a generating method of a detection model, a learning method, and a learning apparatus capable of recognizing a regular constituent object with high accuracy without requiring a large amount of training data and without solving a combinatorial optimization problem for the all components.

Means for Solving the Problem

An estimation program according to an embodiment causes a computer to execute: acquiring a learned detection model that receives a new image as input to output coordinates of a region of a primary component contained in the new image, a label of the primary component, a score of the primary component, coordinates of a region of a secondary component contained in the new image, a label of the secondary component, and a score of the secondary component, and a constituent component model in which a relationship between coordinates of a region of a primary component contained in a prescribed regular constituent object and coordinates of regions of a plurality of secondary components contained in the prescribed regular constituent object are modeled; outputting the coordinates of the region of the primary component contained in the new image, the label of the primary component, the score of the primary component, the coordinates of the region of the secondary component contained in the new image, the label of the secondary component, and the score of the secondary component as constituent component detection results based on the new image by using the learned detection model; estimating first primary component candidates based on the constituent component model and the constituent component detection results and sorting out a secondary component that is not registered with a list of the first primary component candidates; merging a plurality of the first primary component candidates to generate a second primary component candidate; and selecting a secondary component matching the second primary component candidate from among a plurality of secondary components sorted out and registering the selected secondary component with the second primary component candidate.

An estimation apparatus according to an embodiment includes: a storage unit configured to store a learned detection model that receives a new image as input to output coordinates of a region of a primary component contained in the new image, a label of the primary component, a score of the primary component, coordinates of a region of a secondary component contained in the new image, a label of the secondary component, and a score of the secondary component, and a constituent component model in which a relationship between coordinates of a region of a primary component contained in a prescribed regular constituent object and coordinates of regions of a plurality of secondary components contained in the prescribed regular constituent object are modeled; a constituent component detection unit configured to output the coordinates of the region of the primary component contained in the new image, the label of the primary component, the score of the primary component, the coordinates of the region of the secondary component contained in the new image, the label of the secondary component, and the score of the secondary component based on the new image as constituent component detection results by using the learned detection model; a bottom-up estimation unit configured to estimate first primary component candidates, based on the constituent component model and the constituent component detection results and sorting out a secondary component that is not registered with a list of the first primary component candidates; a primary component merge unit configured to merge a plurality of the first primary component candidates to generate a second primary component candidate; and a top-down recognition unit configured to select a secondary component matching the second primary component candidate from among a plurality of secondary components sorted out and register the selected secondary component with the second primary component candidate.

A generating method of a detection model according to an embodiment includes: acquiring training data including a training image, annotation data, a group relationship table, and a label group table, the annotation data including coordinates of a region of a constituent component and a label of the constituent component, the group relationship table defining a relationship between a primary group and a secondary group, the label group table defining a correspondence relationship between the primary group and a label of a primary component, and a correspondence relationship between the secondary group and a label of a secondary component; and generating a detection model by using the training data, the detection model receiving a label of the primary component belonging to the primary group extracted from the training image, coordinates of a region of the primary component, labels of the secondary components belonging to a plurality of the secondary groups, and coordinates of regions of the secondary components as input to output coordinates of a region a prescribed primary component, a label of the prescribed primary component, a score of the prescribed primary component, coordinates of a region of a prescribed secondary component, a label of the prescribed secondary component, and a score of the prescribed secondary component.

A learning method according to an embodiment includes: acquiring training data including a training image, annotation data, a group relationship table, and a label group table, the annotation data including coordinates of a region of a constituent component and a label of the constituent component, the group relationship table defining a relationship between a primary group and a secondary group, the label group table defining a correspondence relationship between the primary group and a label of a primary component, and a correspondence relationship between the secondary group and a label of a secondary component; learning, by using the training data, a detection model that receives a label of the primary component belonging to the primary group extracted from the training image, coordinates of a region of the primary component, labels of the secondary components belonging to a plurality of secondary groups, and coordinates of regions of the secondary components as input to output coordinates of a region a prescribed primary component, a label of the prescribed primary component, a score of the prescribed primary component, coordinates of a region of a prescribed secondary component, a label of the prescribed secondary component, and a score of the prescribed secondary component; and generating, by using the training data, a constituent component model in which a relationship between coordinates of a region of a primary component contained in a prescribed regular constituent object and coordinates of regions of a plurality of secondary components contained in the prescribed regular constituent object are modeled.

A learning apparatus according to an embodiment includes an input unit configured to acquire training data including a training image, annotation data, a group relationship table, and a label group table, the annotation data including coordinates of a region of a constituent component and a label of the constituent component, the group relationship table defining a relationship between a primary group and a secondary group, the label group table defining a correspondence relationship between the primary group and a label of a primary component, and a correspondence relationship between the secondary group and a label of a secondary component; a constituent component detection unit configured to learn, by using the training data, a detection model that receives a label of the primary component belonging to the primary group extracted from the training image, coordinates of a region of the primary component, labels of the secondary components belonging to a plurality of the secondary groups, and coordinates of regions of the secondary components as input to output from the detection model including coordinates of a region a prescribed primary component, a label of the prescribed primary component, a score of the prescribed primary component, coordinates of a region of a prescribed secondary component, a label of the prescribed secondary component, and a score of the prescribed secondary component; and a constituent component modeling unit configured to generate, by using the training data, a constituent component model in which a relationship between coordinates of a region of a primary component contained in a prescribed regular constituent object and coordinates of regions of a plurality of secondary components contained in the prescribed regular constituent object are modeled.

Effects of the Invention

According to the present disclosure, it is possible to provide an estimation program, an estimation apparatus, a generating method of a detection model, a learning method, and a learning apparatus that recognize a regular constituent object with high accuracy without requiring a large amount of training data and without solving a combinatorial optimization problem for the all components.

BRIEF DESCRIPTION OF DRAWINGS

FIG. 4 is a diagram for describing a region in annotation data according to the first embodiment.

FIG. 5 is a diagram illustrating an example of an algorithm used by a constituent component modeling unit according to the first embodiment.

FIG. 10 is a diagram illustrating an example of an algorithm used by a bottom-up estimation unit according to the second embodiment.

FIG. 11 is a diagram illustrating an example of an algorithm used by a primary component merge unit according to the second embodiment.

FIG. 12 is a diagram illustrating an example of an algorithm used by a top-down recognition unit according to the second embodiment.

FIG. 14 is a diagram illustrating an example of an algorithm used by a constituent component modeling unit according to a third embodiment.

FIG. 15 is a diagram illustrating an example of an algorithm used by a constituent component modeling unit according to a fourth embodiment.

FIG. 16 is a diagram illustrating an example of an algorithm used by a top-down recognition unit according to a fifth embodiment.

FIG. 24 is a diagram illustrating a problem of a second object recognition method of related art.

DESCRIPTION OF EMBODIMENTS

Hereinafter, embodiments will be described in detail with reference to the drawings.

First Embodiment

Figure 1:
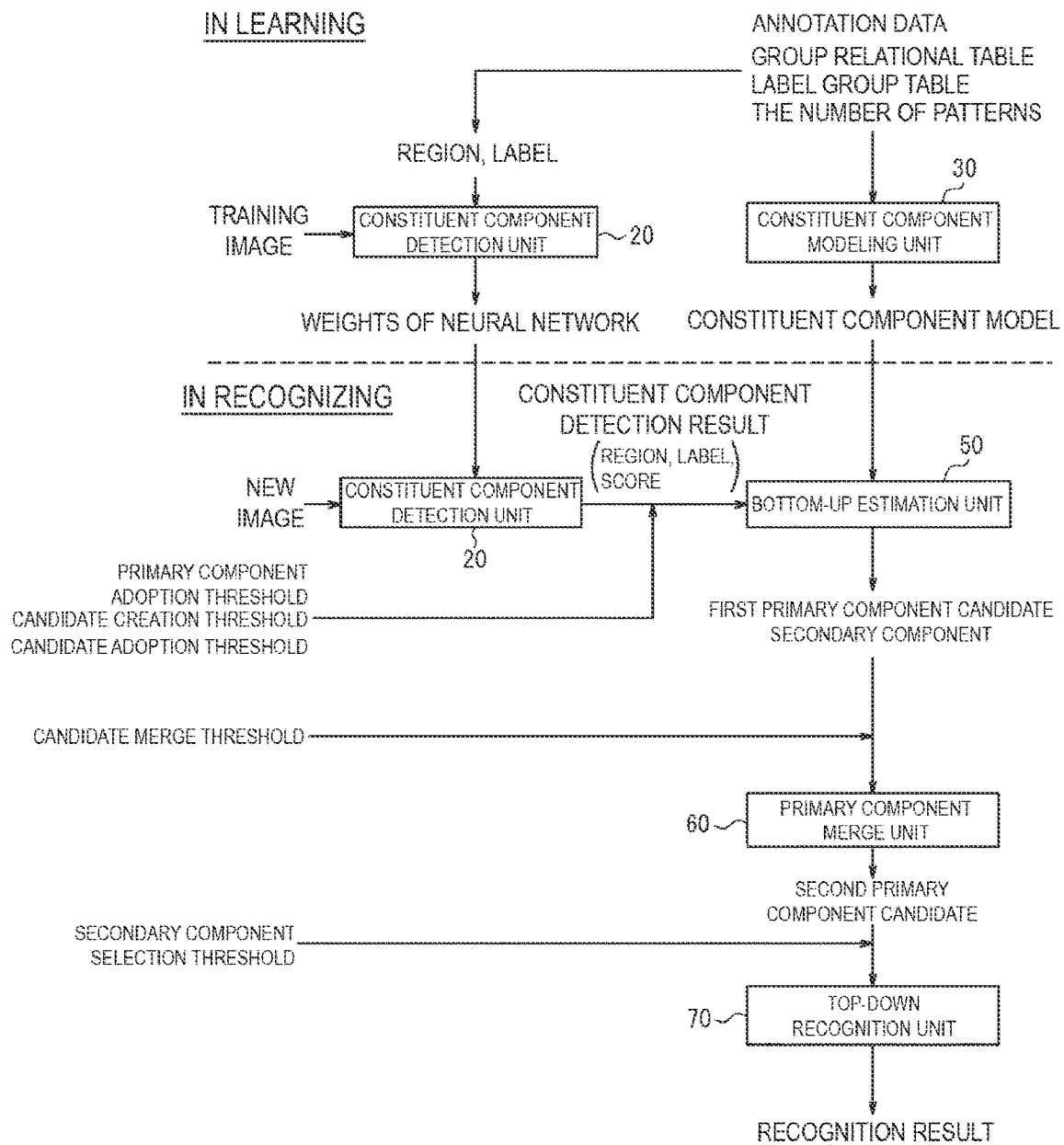
FIG. 1 is a diagram illustrating an example of a conceptual diagram of a learning method and an estimating method according to a first embodiment.

First, an outline of a flow of processes in a learning method and a method for recognizing a regular constituent object using training data according to a first embodiment will be described with reference to FIG. 1.

The training data is data used by a learning apparatus described below, and is, for example, training images, annotation data, group relationship tables, label group tables, the number of patterns, and the like. The training data will be described in detail below.

Herein, a regular constituent object refers to an object that contains a primary component and a plurality of secondary components, and is constituted by a regular combination of these components. The primary component is a whole of the components contained in the regular constituent object. The secondary component is each of a plurality of components contained in the regular constituent object.

In Learning

A constituent component detection unit 20 learns a detection model using a label of a primary component belonging to a primary group extracted from a training image, coordinates of a region of the primary component, labels of secondary components belonging to a plurality of secondary groups extracted from the training image, and coordinates of regions of the secondary components. The detection model is a neural network into which input are a training image, a label of a primary component, coordinates of a region of the primary component, a label of a secondary component, and coordinates of a region of the secondary component, and from which output are a label of a prescribed primary component, coordinates of a region of the prescribed primary component, a score of the prescribed primary component, a label of a prescribed secondary component, coordinates of a region of the prescribed secondary component, and a score of the prescribed secondary component. The score indicates a probability that a prescribed component (a detected primary component or secondary component) exists in a prescribed region (a detected region).

A constituent component modeling unit 30 uses the training data to generate a constituent component model in which a relationship is modeled between a position of the primary component (coordinates of the region of the primary component) contained in a prescribed regular constituent object and positions of the plurality of secondary components (coordinates of the regions of the secondary components) contained in the prescribed regular constituent object. The constituent component model is generated, for example, by various algorithms described below, or in accordance with implement of a neural network different from the detection model used by the constituent component detection unit.

In Recognizing

The constituent component detection unit 20 uses the learned detection model, to detect, based on a new image, a label of a primary component contained in the new image, coordinates of a region of the primary component contained in the new image, a score of the primary component contained in the new image, a label of a secondary component contained in the new image, coordinates of a region of the secondary component contained in the new image, and a score of the secondary component contained in the new image, and output the detected resultants as constituent component detection results.

A bottom-up estimation unit 50 estimates first primary component candidates, based on the constituent component detection results, the constituent component model, a primary component adoption threshold, a candidate creation threshold, and a candidate adoption threshold, and sorts out secondary components that are not registered with the first primary component candidate.

A primary component merge unit 60 merges a plurality of first primary component candidates, based on a candidate merge threshold, and removes an unnecessary first primary component candidate. Then, the primary component merge unit 60 corrects coordinates of regions of a plurality of merged first primary component candidates by using coordinates of regions of the first primary component candidates, scores of the first primary component candidates, and the like to generate a second primary component candidate.

A top-down recognition unit 70 selects a secondary component matching the second primary component candidate from among the plurality of sorted out secondary components and registers the selected secondary component with the second primary component candidate.

Hereinafter, a learning apparatus, learning method, estimation apparatus, and estimation method according to the first embodiment will be described in order with reference to FIGS. 2 to 16 and Tables 1 to 15.

Configuration of Learning Apparatus

An example of a configuration of a learning apparatus 100 according to the present embodiment will be described with reference to FIG. 2.

Figure 2:
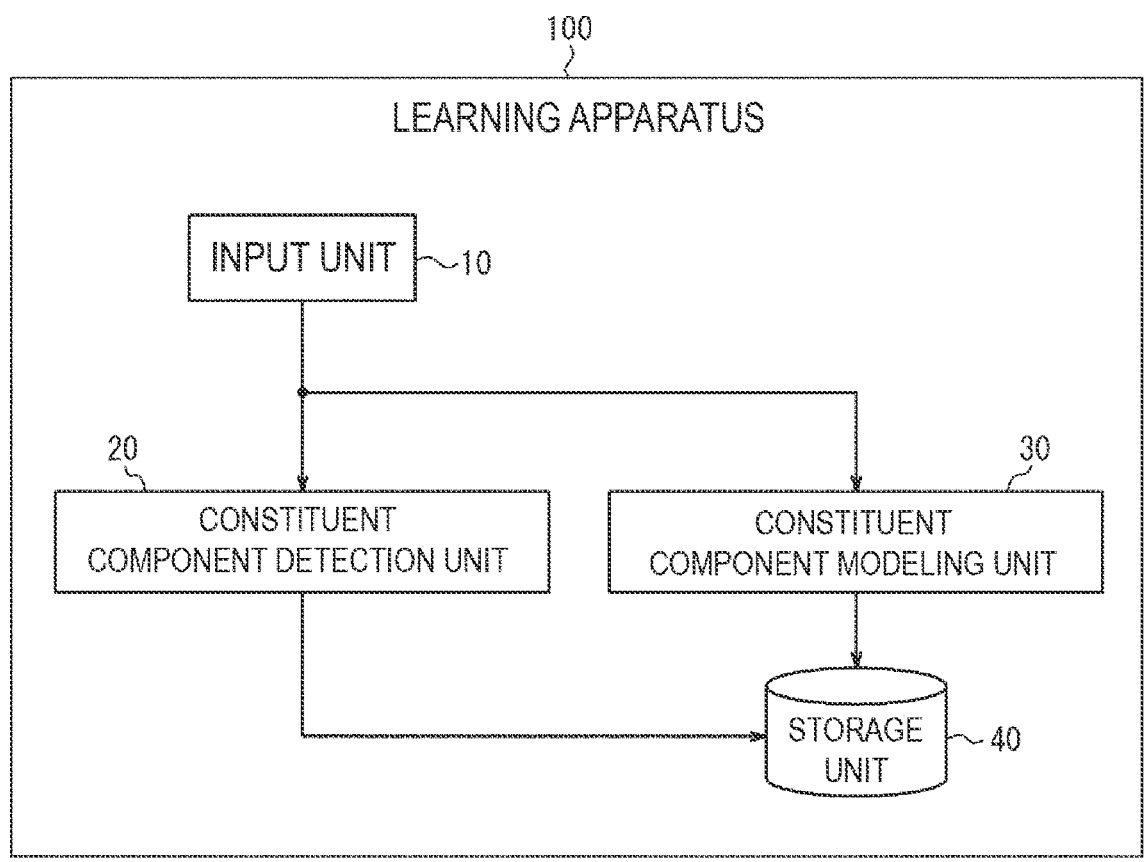
FIG. 2 is a diagram illustrating an example of a configuration of a learning apparatus according to the first embodiment.

As illustrated in FIG. 2, the learning apparatus 100 includes an input unit 10, the constituent component detection unit 20, the constituent component modeling unit 30, and a storage unit 40.

The learning apparatus 100 is an apparatus, for example, constituted by a known or dedicated computer including a central processing unit (CPU), a main memory (random access memory (RAM)), and the like into which a prescribed program is read. The learning apparatus 100, for example, executes each process under control of the central processing unit. Data input to the learning apparatus 100 and data obtained in each process are, for example, stored in the main memory, and the data stored in the main memory is read out as needed to the central processing unit to be used for other processes. At least some of processing units of the learning apparatus 100 may include hardware such as an integrated circuit. Each storage unit included in the learning apparatus 100 can include, for example, a main memory such as a RAM, or middleware such as a relational database or a key-value store. However, each storage unit does not need to be provided inside the learning apparatus 100, and may be constituted by an auxiliary storage device including a hard disk, an optical disk, or a semiconductor memory element such as a flash memory and may be provided outside the learning apparatus 100.

The input unit 10 acquires training data from, for example, a network, a file, or the like, and provides the training data to the constituent component detection unit 20 and the constituent component modeling unit 30 as an input.

Figure 3:
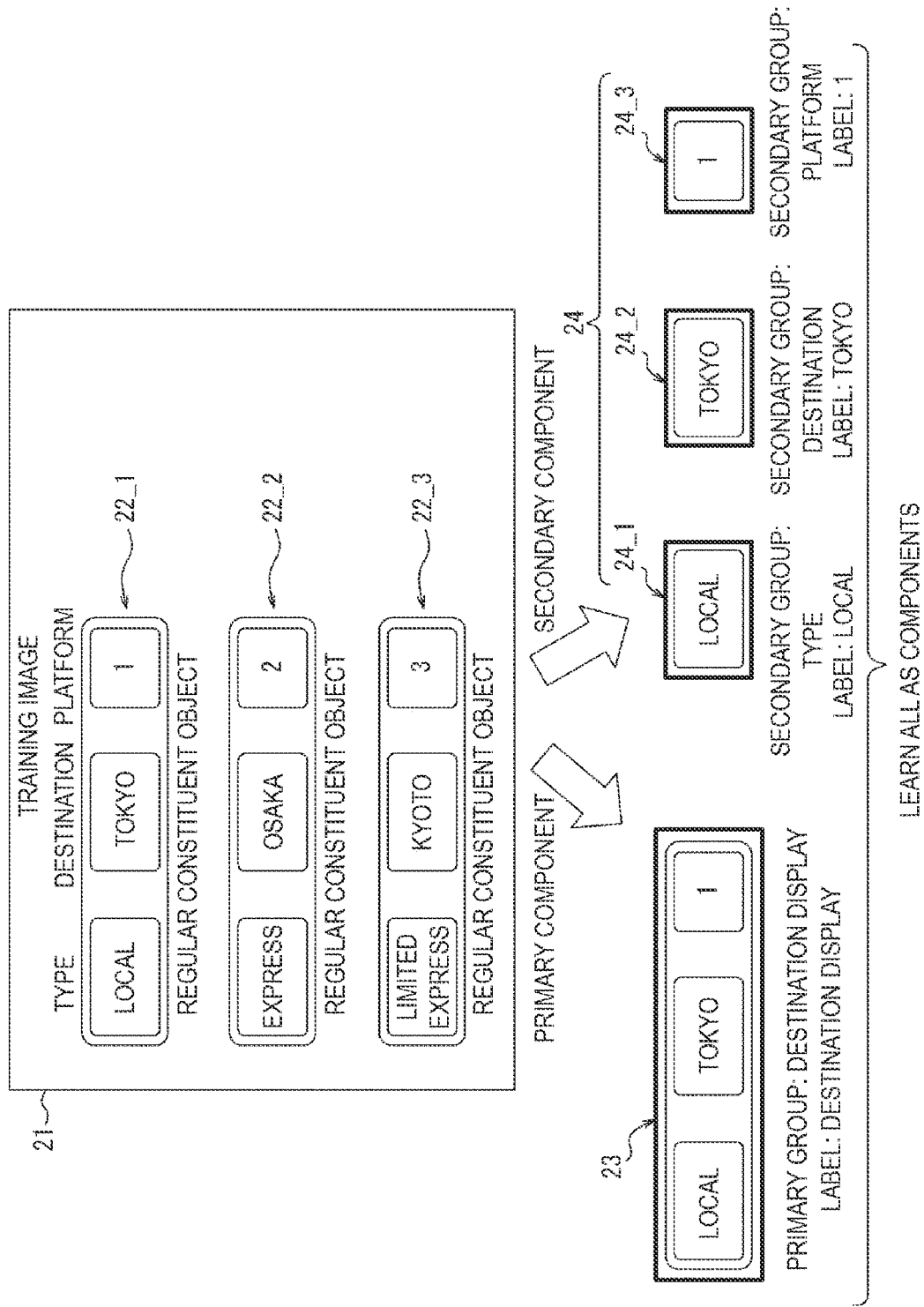
FIG. 3 is a diagram illustrating an example of a primary component and secondary components contained in a regular constituent object according to the first embodiment.

The training data includes, for example, a training image 21 as illustrated in FIG. 3. The training image 21 includes a plurality of regular constituent objects 22 (22_1, 22_1, 22_3). The regular constituent object 22 is, for example, a destination indicator. In the regular constituent object 22_1, for example, a name of a primary group is "destination display", and a label of a primary component 23 belonging to the "destination display" group is "destination display." In the regular constituent object 22_1, for example, a name of a secondary group is "type", and a label of a secondary component 24_1 belonging to the "type" group is "local". In the regular constituent object 22_1, for example, a name of a secondary group is "destination", and a label of a secondary component 24_2 belonging to the "destination" group is "Tokyo". In the regular constituent object 22_1, for example, a name of a secondary group is "platform", and a label of a secondary component 24_3 belonging to the "platform" group is "1". In the regular constituent object 22, the name of the primary group and the label of the primary component 23 belonging to the primary group are set to be the same.

The training data includes, for example, annotation data as illustrated in Table 1. The annotation data includes a constituent component number (component number), a training image number (image number), coordinates of a region of a constituent component (region), a label of a constituent component, and the like. In a case that the constituent component is a secondary component, the annotation data includes a number of a primary component (primary component number).

TABLE 1

| Component Number | Image Number | Region | Label | Primary Component Number |
|---|---|---|---|---|
| 1 | 1 | $(cx_1, cy_1, w_1, h_1)$ | Destination Display | Null |
| 2 | 1 | $(cx_2, cy_2, w_2, h_2)$ | Local | 1 |
| 3 | 1 | $(cx_3, cy_3, w_3, h_3)$ | Tokyo | 1 |
| 4 | 1 | $(cx_4, cy_4, w_4, h_4)$ | 1 | 1 |
| . | . | . | . | . |
| . | . | . | . | . |
| . | . | . | . | . |

FIG. 4 is a diagram for describing coordinates of a region of a constituent component in annotation data.

The coordinates of the region of the constituent component in the annotation data are coordinates collectively representing, in a case that a width and height of the training image 21 are scaled to be 1.0, central coordinates (cx, cy) of a circumscribed rectangle that is circumscribed around the constituent component, a width w of the circumscribed rectangle, and a height h of the circumscribed rectangle.

As illustrated in FIG. 4, the coordinates of the region of the primary component 23 (label: "destination display") is represented by coordinates $(cx_1, cy_1, w_1, h_1)$ based on the basis of central coordinates $(cx_1, cy_1)$ of the circumscribed rectangle, a width $w_1$ of the circumscribed rectangle, and a height $h_1$ of the circumscribed rectangle. The coordinates of the region of the secondary component 24_1 (label: "local") is represented by coordinates $(cx_2, cy_2, w_2, h_2)$ on the basis of central coordinates $(cx_2, cy_2)$ of a circumscribed rectangle, a width $w_2$ of the circumscribed rectangle, and a height $h_2$ of the circumscribed rectangle. The coordinates of the region of the secondary component 24_2 (label: "Tokyo") is represented by coordinates $(cx_3, cy_3, w_3, h_3)$ on the basis of central coordinates $(cx_3, cy_3)$ of a circumscribed rectangle, a width $w_3$ of the circumscribed rectangle, and a height $h_3$ of the circumscribed rectangle. The coordinates of the region of the secondary component 24_3 (label: "1") is represented by coordinates $(cx_4, cy_4, w_4, h_4)$ on the basis of central coordinates $(cx_4, cy_4)$ of a circumscribed rectangle, a width $w_4$ of the circumscribed rectangle, and a height ha of the circumscribed rectangle.

The training data includes, for example, a group relational table as illustrated in Table 2. For example, a name of a primary group is "destination display." For example, a name of a secondary group is "type", "destination", or "platform." In the example illustrated in Table 2, three secondary groups belong to the primary group.

TABLE 2

| Secondary Group | Primary Group |
|---|---|
| Type | Destination Display |
| Destination | Destination Display |
| Platform | Destination Display |

The training data includes, for example, a label group table as illustrated in Table 3. For example, one label of the primary component belongs to the primary group "destination display." For example, three labels of a label "local" of the secondary component, a label "express" of secondary component, and a label "limited express" of the secondary component belong to the secondary group "type." For example, three labels of a label "Tokyo" of the secondary component, a label "Osaka" of secondary component, and a label "Kyoto" of the secondary component belong to the secondary group "destination." For example, three labels of a label "1" of the secondary component, a label "2" of secondary component, and a label "3" of the secondary component belong to the secondary group "platform." The name of the primary group and the label of the primary component 23 belonging to the primary group are set to be the same.

TABLE 3

| Label | Group |
|---|---|
| Destination Display | Destination Display |
| Local | Type |
| Express | Type |
| Limited Express | Type |
| Tokyo | Destination |
| Osaka | Destination |
| Kyoto | Destination |
| 1 | Platform |
| 2 | Platform |
| 3 | Platform |

The constituent component detection unit 20 extracts, from the training image 21, the label "destination display" of the primary component 23, the coordinates ($cx_1$, $cy_1$, $w_1$, $h_1$) of the region of the primary component 23, the labels "local," "express," and "limited express" of the secondary component 24_1, the coordinates ($cx_2$, $cy_2$, $w_2$, $h_2$) of the region of the secondary components 24_1, the labels "Tokyo," "Osaka," and "Kyoto" of the secondary components 24_2, the coordinates ($cx_3$, $cy_3$, $w_3$, $h_3$) of the region of the secondary component 24_2, the labels "1," "2," and "3" of the secondary component 24_3, and the coordinates ($cx_4$, $cy_4$, $w_4$, $h_4$) of the region of the secondary component 24_3, in all of the plurality of regular constituent objects 22 (22_1, 22_2, 22_3). Then, the constituent component detection unit 20 leans a detection model by using the label "destination display" of the primary component 23, the coordinates ($cx_1$, $cy_1$, $w_1$, $h_1$) of the region of the primary component 23, the labels "local," "express," and "limited express" of the secondary component 24_1, the coordinates ($cx_2$, $cy_2$, $w_2$, $h_2$) of the region of the secondary components 24_1, the labels "Tokyo," "Osaka," and "Kyoto" of the secondary components 24_2, the coordinates ($cx_3$, $cy_3$, $w_3$, $h_3$) of the region of the secondary component 24_2, the labels "1," "2," and "3" of the secondary component 24_3, and the coordinates ($cx_4$, $cy_4$, $w_4$, $h_4$) of the region of the secondary component 24_3. Then, the constituent component detection unit 20 stores the learned detection model in the storage unit 40.

As described above, the constituent component detection unit 20 learns the detection model by using a total of 10 labels obtained by an addition, specifically, 1+3+3+3=10 labels, that are one label "destination display" in the primary component 23 belonging to the primary group "destination display", and the following labels in addition. Such labels include three labels "local," "express," and "limited express" of the secondary component 24_1 belonging to the secondary group "type", three labels "Tokyo," "Osaka," and "Kyoto" of the secondary component 24_2 belonging to the secondary group "destination", and three labels "1," "2," and "3" of the secondary component 24_3 belonging to the secondary group "platform". On the other hand, in related art, a detection model is learned using a total of 27 labels obtained by a multiplication, specifically, 3×3×3=27 labels, that are three labels "local," "express," and "limited express", three labels "Tokyo," "Osaka," and "Kyoto", and three labels "1," "2," and "3". Accordingly, the constituent component detection unit 20 can perform appropriate learning with a smaller number of labels compared to related art.

The constituent component modeling unit 30 uses Algorithm 1 illustrated in FIG. 5, for example, on the basis of the training data to generate a constituent component model in which a relationship is modeled between a position of the primary component (coordinates of the region of the primary component) contained in a prescribed regular constituent object and positions of the plurality of secondary components (coordinates of the regions of the secondary components) contained in the prescribed regular constituent object. For example, the constituent component modeling unit 30 generates constituent component model in which a relationship is modeled between the coordinates ($cx_1$, $cy_1$, $w_1$, $h_1$) of the region of the primary component 23 contained in the regular constituent object 22_1 and the coordinates of the regions the plurality of secondary components contained in the regular constituent object 22_1, that are, the coordinates ($cx_2$, $cy_2$, $w_2$, $h_2$) of the region of the secondary component 24-1, the coordinates ($cx_3$, $cy_3$, $w_3$, $h_3$) of the region of the secondary components 24-2, and the coordinates ($cx_4$, $cy_4$, $w_4$, $h_4$) of the region of the secondary components 24-3.

First, the constituent component modeling unit 30 generates a regular constituent object list illustrated in Table 5, corresponding to an example of the regular constituent object illustrated in Table 4. The constituent component modeling unit 30 generates the regular constituent object list including, for example, nine regular constituent objects.

TABLE 4

| Component Group Name | Region |
|---|---|
| Destination Display | ($cx^{destination\ display}$, $cy^{destination\ display}$, $w^{destination\ display}$, $h^{destination\ display}$) |
| Type | ($cx^{type}$, $cy^{type}$, $w^{type}$, $h^{type}$) |
| Destination | ($cx^{destination}$, $cy^{destination}$, $w^{destination}$, $h^{destination}$) |
| Platform | ($cx^{platform}$, $cy^{platform}$, $w^{platform}$, $h^{platform}$) |

TABLE 5

| Number | Component Group Name | Region |
|---|---|---|
| 1 | Destination Display | (0.57, 0.47, 0.74, 0.14) |
|   | Type | (0.32, 0.47, 0.2, 0.1) |
|   | Destination | (0.62, 0.47, 0.2, 0.1) |
|   | Platform | (0.86, 0.47, 0.12, 0.1) |
| 2 | Destination Display | (0.53, 0.52, 0.75, 0.23) |
|   | Type | (0.28, 0.55, 0.21, 0.12) |
|   | Destination | (0.58, 0.52, 0.21, 0.12) |
|   | Platform | (0.81, 0.49, 0.13, 0.11) |
| 3 | Destination Display | (0.51, 0.61, 0.75, 0.23) |
|   | Type | (0.26, 0.58, 0.21, 0.12) |
|   | Destination | (0.56, 0.62, 0.21, 0.12) |
|   | Platform | (0.8, 0.65, 0.13, 0.11) |
| 4 | Destination Display | (0.42, 0.43, 0.74, 0.41) |
|   | Type | (0.19, 0.52, 0.22, 0.17) |
|   | Destination | (0.47, 0.41, 0.22, 0.17) |
|   | Platform | (0.69, 0.32, 0.15, 0.14) |
| 5 | Destination Display | (0.48, 0.47, 0.75, 0.33) |
|   | Type | (0.23, 0.54, 0.22, 0.15) |
|   | Destination | (0.52, 0.46, 0.22, 0.15) |
|   | Platform | (0.76, 0.4, 0.14, 0.13) |
| 6 | Destination Display | (0.53, 0.52, 0.75, 0.24) |
|   | Type | (0.28, 0.55, 0.21, 0.13) |
|   | Destination | (0.58, 0.51, 0.21, 0.13) |
|   | Platform | (0.81, 0.48, 0.13, 0.12) |
| 7 | Destination Display | (0.57, 0.7, 0.74, 0.41) |
|   | Type | (0.34, 0.61, 0.22, 0.17) |

TABLE 5-continued

| Number | Component Group Name | Region |
|---|---|---|
| | Destination | (0.61, 0.72, 0.22, 0.17) |
| | Platform | (0.84, 0.81, 0.15, 0.14) |
| 8 | Destination Display | (0.54, 0.66, 0.75, 0.33) |
| | Type | (0.3, 0.6, 0.22, 0.15) |
| | Destination | (0.59, 0.68, 0.22, 0.15) |
| | Platform | (0.82, 0.74, 0.14, 0.13) |
| 9 | Destination Display | (0.51, 0.62, 0.75, 0.24) |
| | Type | (0.26, 0.59, 0.21, 0.13) |
| | Destination | (0.56, 0.63, 0.21, 0.13) |
| | Platform | (0.79, 0.66, 0.13, 0.12) |

As illustrated in Table 4, in a case that the name of the primary group is "destination display," coordinates of a region of a primary component are represented by ($cx^{destination\ display}$, $cy^{destination\ display}$, $w^{destination\ display}$, $h^{destination\ display}$). In a case that the name of the secondary group is "type," coordinates of a region of a secondary component are represented by ($cx^{type}$, $cy^{type}$, $w^{type}$, $h^{type}$). In a case that the name of the secondary group is "destination," coordinates of a region of a secondary component are represented by ($cx^{destination}$, $cy^{destination}$, $w^{destination}$, $h^{destination}$). In a case that the name of the secondary group is "platform," coordinates of a region of a secondary component are represented by ($cx^{platform}$, $cy^{platform}$, $w^{platform}$, $h^{platform}$).

As illustrated in Table 5, for example, in a regular constituent object indicated by 'NO. 1', the coordinates of the region of the primary component in the case of the name "destination display" of the primary group is expressed as (0.57, 0.47, 0.74, 0.14), the coordinates of the region of the secondary component in the case of the name "type" of the secondary group is expressed as (0.32, 0.47, 0.2, 0.1), the coordinates of the region of the secondary component in the case of the name "destination" of the secondary group is expressed as (0.62, 0.47, 0.2, 0.1), and the coordinates of the region of the secondary component in the case of the name "platform" of the secondary group is expressed as (0.86, 0.47, 0.12, 0.1).

Next, the constituent component modeling unit 30 normalizes the coordinates of the regions of the plurality of secondary components contained in a prescribed regular constituent object by using the coordinates of the region of the primary component contained in the prescribed regular constituent object for all the regular constituent objects included in the regular constituent object list illustrated in Table 5. For example, for the regular constituent object indicated by 'NO. 1', the constituent component modeling unit 30 normalizes the coordinate (0.32, 0.47, 0.2, 0.1) of region of the secondary component belonging to the "type" group, the coordinates (0.62, 0.47, 0.2, 0.1) of region of the secondary component belonging to the "destination" group, and the coordinates (0.86, 0.47, 0.12, 0.1) of the region of the secondary component belonging to the "platform" group by using the coordinates (0.57, 0.47, 0.74, 0.14) of the region of the primary component belonging to the "destination display" group.

Next, the constituent component modeling unit 30 calculates tilts of the plurality of secondary components contained in a prescribed regular constituent object, based on the central coordinates of the regions of the secondary components on both ends contained in the prescribed regular constituent object, for all the regular constituent objects included in the regular constituent object list illustrated in Table 5. For example, for the regular constituent object indicated by 'NO. 1', the constituent component modeling unit 30 calculates tilts of the secondary component belonging to the "type" group, secondary component belonging to the "destination" group, and secondary component belonging to the "platform" group contained in the regular constituent object indicated by 'NO. 1', based on the central coordinates (0.32, 0.47) of the region of the secondary component belonging to the "type" group and the central coordinates (0.86, 0.47) of the region of the secondary component belonging to the "platform" group.

Next, the constituent component modeling unit 30 divides a range of the tilts into P patterns, based on the tilts of the plurality of secondary components contained in a prescribed regular constituent object, for all the regular constituent objects included in the regular constituent object list illustrated in Table 5. Specifically, the constituent component modeling unit 30 divides, into P patterns, the relationship between the position of the primary component contained in the prescribed regular constituent object and the positions of the plurality of secondary components contained in the prescribed regular constituent object. For example, the constituent component modeling unit 30 divides, into three patterns, the range of the tilts of the secondary component belonging to the "type" group, secondary component belonging to the "destination" group, and secondary component belonging to the "platform" group for nine regular constituent objects included in the regular constituent object list illustrated in Table 5.

Next, the constituent component modeling unit 30 calculates, for each of the divided P patterns, average values of the coordinates of the regions of the primary components contained in the prescribed regular constituent objects and average values of the coordinates of the regions of the plurality of secondary components included in the prescribed regular constituent objects, for all the regular constituent objects included in the regular constituent object list illustrated in Table 5. Furthermore, the constituent component modeling unit 30 generates a constituent pattern list illustrated in Table 7 by associating the average values with an example of a constituent pattern illustrated in Table 6. For example, the constituent component modeling unit 30 calculates average values of the coordinates of the regions of the primary components belonging to the "destination display" group, average values of the coordinates of the regions of the secondary components belonging to the "type" group, average values of the coordinates of the regions of the secondary components belonging to the "destination" group, and average values of the coordinates of the regions of the secondary components belonging to the "platform" group, for each of three patterns obtained by dividing nine regular constituent objects included in the regular constituent object list illustrated in Table 5, to generate the constituent pattern list.

TABLE 6

| Component Group Name | Region |
|---|---|
| Destination Display | ($pcx^{destination\ display}$, $pcy^{destination\ display}$, $pw^{destination\ display}$, $ph^{destination\ display}$) |
| Type | ($pcx^{type}$, $pcy^{type}$, $pw^{type}$, $ph^{type}$) |
| Destination | ($pcx^{destination}$, $pcy^{destination}$, $pw^{destination}$, $ph^{destination}$) |
| Platform | $pcx^{platform}$, $pcy^{platform}$, $pw^{platform}$, $ph^{platform}$) |

TABLE 7

| Number | Component Group Name | Region |
|---|---|---|
| 1 | Destination Display | (0.5, 0.5, 1, 1) |
|   | Type | (0.32, 0.47, 0.2, 0.1) |
|   | Destination | (0.62, 0.47, 0.2, 0.1) |
|   | Platform | (0.86, 0.47, 0.12, 0.1) |
| 2 | Destination Display | (0.5, 0.5, 1, 1) |
|   | Type | (0.23, 0.54, 0.22, 0.15) |
|   | Destination | (0.52, 0.46, 0.22, 0.15) |
|   | Platform | (0.76, 0.4, 0.14, 0.13) |
| 3 | Destination Display | (0.5, 0.5, 1, 1) |
|   | Type | (0.3, 0.6, 0.22, 0.15) |
|   | Destination | (0.59, 0.68, 0.22, 0.15) |
|   | Platform | (0.82, 0.74, 0.14, 0.13) |

As illustrated in Table 6, in a case that the name of the primary group is "destination display," coordinates of a region of a primary component are represented by ($pcx^{destination\ display}$, $pcy^{destination\ display}$, $pw^{destination\ display}$, $ph^{destination\ display}$). In a case that the name of the secondary group is "type," coordinates of a region of a secondary component are represented by ($pcx^{type}$, $pcy^{type}$, $pw^{type}$, $ph^{type}$). In a case that the name of the secondary group is "destination," coordinates of a region of a secondary component are represented by ($pcx^{destination}$, $pcy^{destination}$, $pw^{destination}$, $ph^{destination}$). In a case that the name of the secondary group is "platform," coordinates of a region of a secondary component are represented by ($pcx^{platform}$, $pcy^{platform}$, $pw^{platform}$, $ph^{platform}$).

As illustrated in Table 7, for example, in a constituent pattern indicated by 'NO. 1', the coordinates of the region of the primary component in the case of the name "destination display" of the primary group is expressed as (0.5, 0.5, 1.0, 1.0), the coordinates of the region of the secondary component in the case of the name "type" of the secondary group is expressed as (0.32, 0.47, 0.2, 0.1), the coordinates of the region of the secondary component in the case of the name "destination" of the secondary group is expressed as (0.62, 0.47, 0.2, 0.1), and the coordinates of the region of the secondary component in the case of the name "platform" of the secondary group is expressed as (0.86, 0.47, 0.12, 0.1).

As illustrated in Table 7, for example, in a constituent pattern indicated by 'NO. 2', the coordinates of the region of the primary component in the case of the name "destination display" of the primary group is expressed as (0.5, 0.5, 1.0, 1.0), the coordinates of the region of the secondary component in the case of the name "type" of the secondary group is expressed as (0.23, 0.54, 0.22, 0.15), the coordinates of the region of the secondary component in the case of the name "destination" of the secondary group is expressed as (0.52, 0.46, 0.22, 0.15), and the coordinates of the region of the secondary component in the case of the name "platform" of the secondary group is expressed as (0.76, 0.4, 0.14, 0.13).

As illustrated in Table 7, for example, in a constituent pattern indicated by 'NO. 3', the coordinates of the region of the primary component in the case of the name "destination display" of the primary group is expressed as (0.5, 0.5, 1.0, 1.0), the coordinates of the region of the secondary component in the case of the name "type" of the secondary group is expressed as (0.3, 0.6, 0.22, 0.15), the coordinates of the region of the secondary component in the case of the name "destination" of the secondary group is expressed as (0.59, 0.68, 0.22, 0.15), and the coordinates of the region of the secondary component in the case of the name "platform" of the secondary group is expressed as (0.82, 0.74, 0.14, 0.13).

Next, the constituent component modeling unit 30 stores the generated constituent component model (e.g., annotation data, group relationship table, label group table, the number of patterns, constituent pattern list, and the like) in the storage unit 40.

As illustrated in FIG. 6, in the training image 21, a relationship between a position of the primary component 23 contained in the regular constituent object 22 (22_1, 22_2, 22_3) and positions of the plurality of secondary components 24 (24_1, 24_2, 24_3) contained in the regular constituent object 22 (22_1, 22_2, 22_3) changes depending on various conditions (for example, an image capture position, a shot angle, and the like).

Figure 6A:
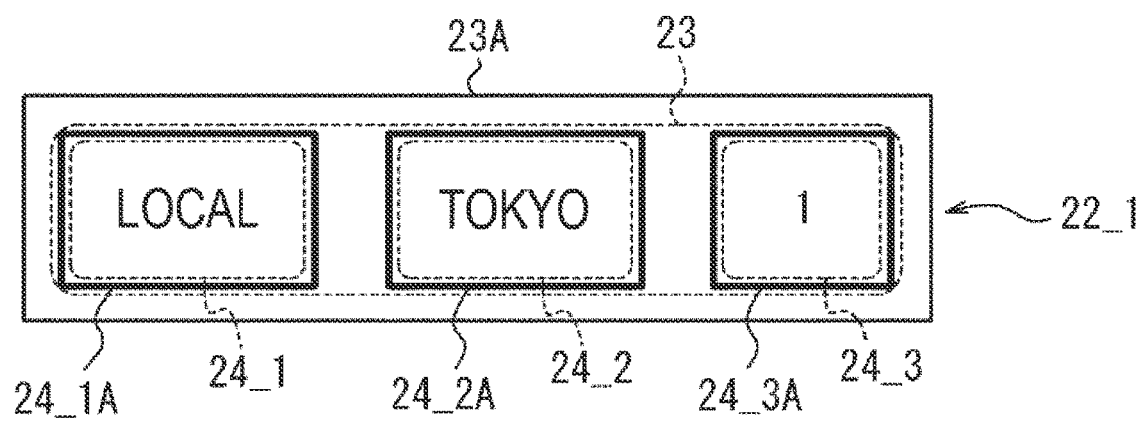
FIG. 6A is a diagram illustrating an example of a constituent component model according to the first embodiment.
Figure 6B:
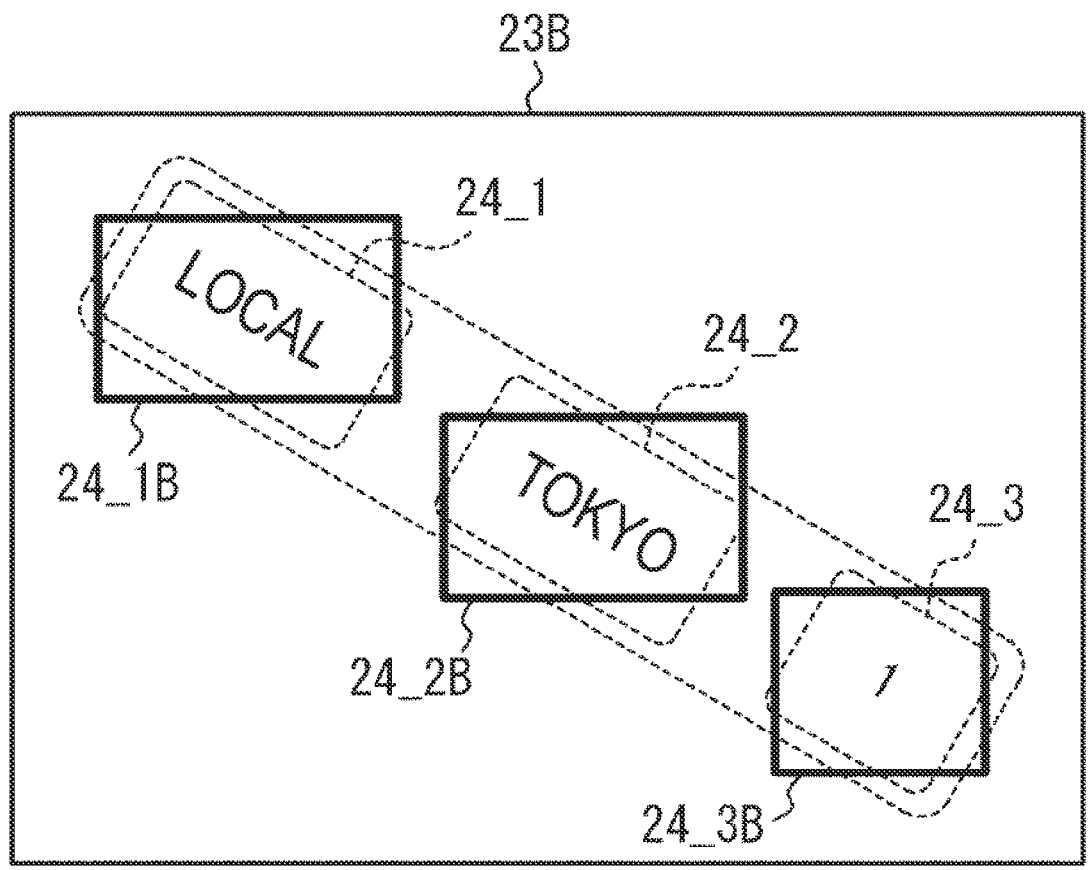
FIG. 6B is a diagram illustrating an example of the constituent component model according to the first embodiment.

For example, in an example illustrated in FIG. 6A, a region 24_1A of the secondary component 24_1 contained in the regular constituent object 22_1, a region 24_2A of the secondary component 24_2 contained in the regular constituent object 22_1, and a region 24_3A of the secondary component 24_3 contained in the regular constituent object 22_1 are aligned in parallel inside a region 23A of the primary component 23 contained in the regular constituent object 22_1. On the other hand, in an example illustrated in FIG. 6B, a region 24_1B of the secondary component 24_1 contained in the regular constituent object 22_1, a region 24_2B of the secondary component 24_2 contained in the regular constituent object 22_1, and a region 24_3B of the secondary component 24_3 contained in the regular constituent object 22_1 are diagonally aligned inside a region 23B of the primary component 23 contained in the regular constituent object 22_1.

Accordingly, the constituent component modeling unit 30 models, in a plurality of patterns, the relationship between the position of the primary component contained in the prescribed regular constituent object and the positions of the plurality of secondary components contained in the prescribed regular constituent object, and thus, an accurate combination of constituent components can be generated even if the secondary components are aligned in any direction.

The storage unit 40 is any of those having a function to store data, such as a hard disk, for example. The storage unit 40 stores, for example, a learned detection model, various constituent component models, and the like. The storage unit 40 stores, for example, the training image, the annotation data, the group relationship table, the label group table, the number of patterns, the constituent pattern list, and the like. The storage unit 40 stores also various programs, data, and the like, for example, in addition to the above.

According to the learning apparatus 100 according to the present embodiment, the constituent component detection unit 20 learns the detection model with a smaller number of labels as compared to related art, and the constituent component modeling unit 30 models the positional relationship between the primary component and the plurality of secondary components in the regular constituent object. This allows implementation of the learning apparatus 100 that performs appropriate learning without requiring a large amount of training data and without solving the combinatorial optimization problem for all the components.

Learning Method

Figure 7:
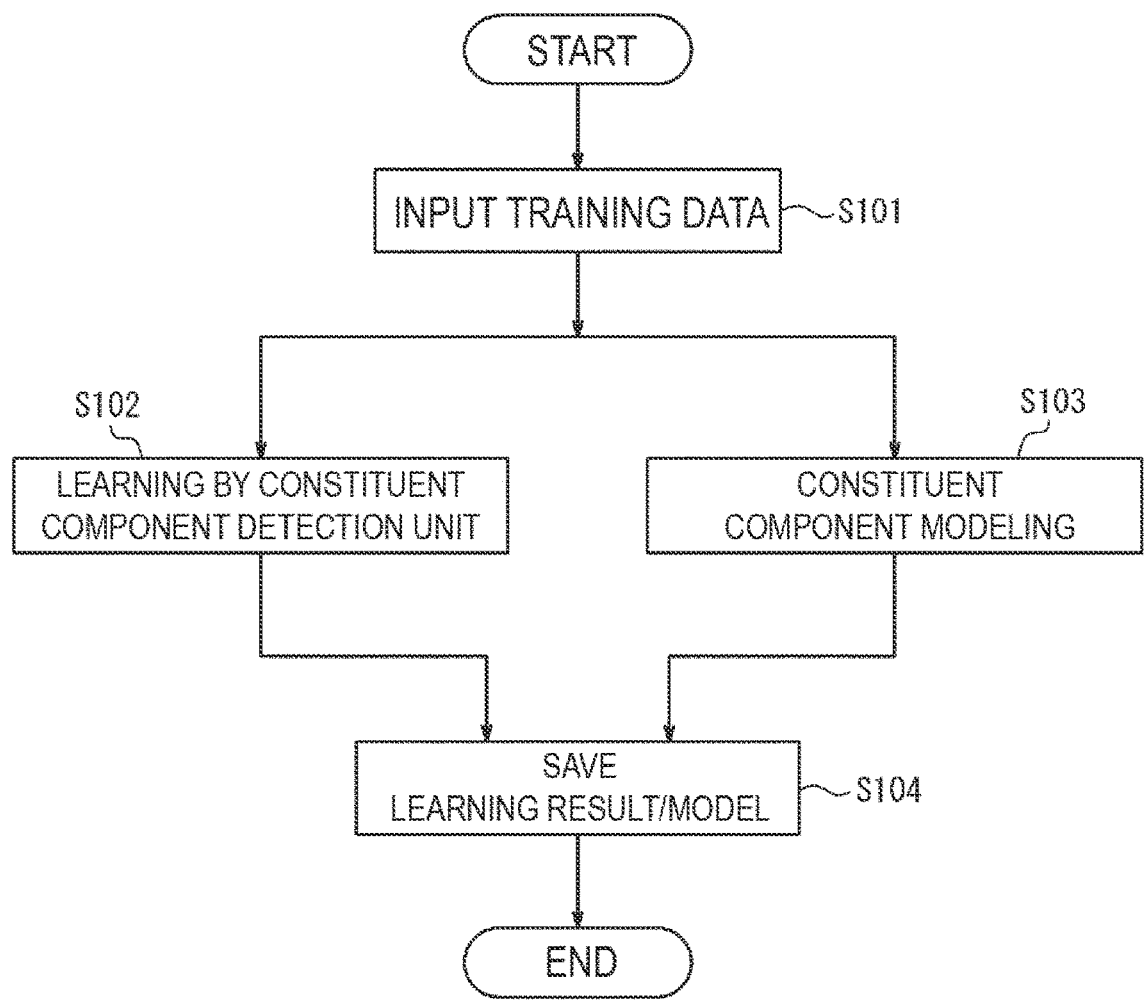
FIG. 7 is a flowchart illustrating an example of the learning method according to the first embodiment.

Next, the learning method according to the present embodiment will be described with reference to FIG. 7. FIG. 7 is a flowchart illustrating an example of the learning method.

In step S101, the input unit 10 acquires training data from, for example, a network, a file, or the like, and provides the training data to the constituent component detection unit 20 and the constituent component modeling unit 30 as an input.

In step S102, the constituent component detection unit 20 learns a detection model that uses a label of a primary component belonging to a primary group extracted from a training image, coordinates of a region of the primary component, labels of secondary components belonging to a plurality of secondary groups extracted from the training image, and coordinates of regions of the secondary components to detect coordinates of a region of a prescribed primary component, a label of the prescribed primary component, a score of the prescribed primary component, coordinates of a region of a prescribed secondary component, a label of the prescribed secondary component, and a score of the prescribed component.

In step S103, the constituent component modeling unit 30 uses the training data (e.g., annotation data) to generate a constituent component model in which a relationship is modeled between a position of the primary component contained in a prescribed regular constituent object and positions of a plurality of secondary components contained in the prescribed regular constituent object.

In step S104, the storage unit 40 stores the learned detection model, the constituent component model, and the like.

According to the learning method in the present embodiment, the learning method is realized that performs appropriate learning without requiring a large amount of training data and without solving the combinatorial optimization problem for the all components.

Second Embodiment

Configuration of Estimation Apparatus

Next, an example of a configuration of an estimation apparatus 200 according to a second embodiment will be described with reference to FIG. 8.

Figure 8:
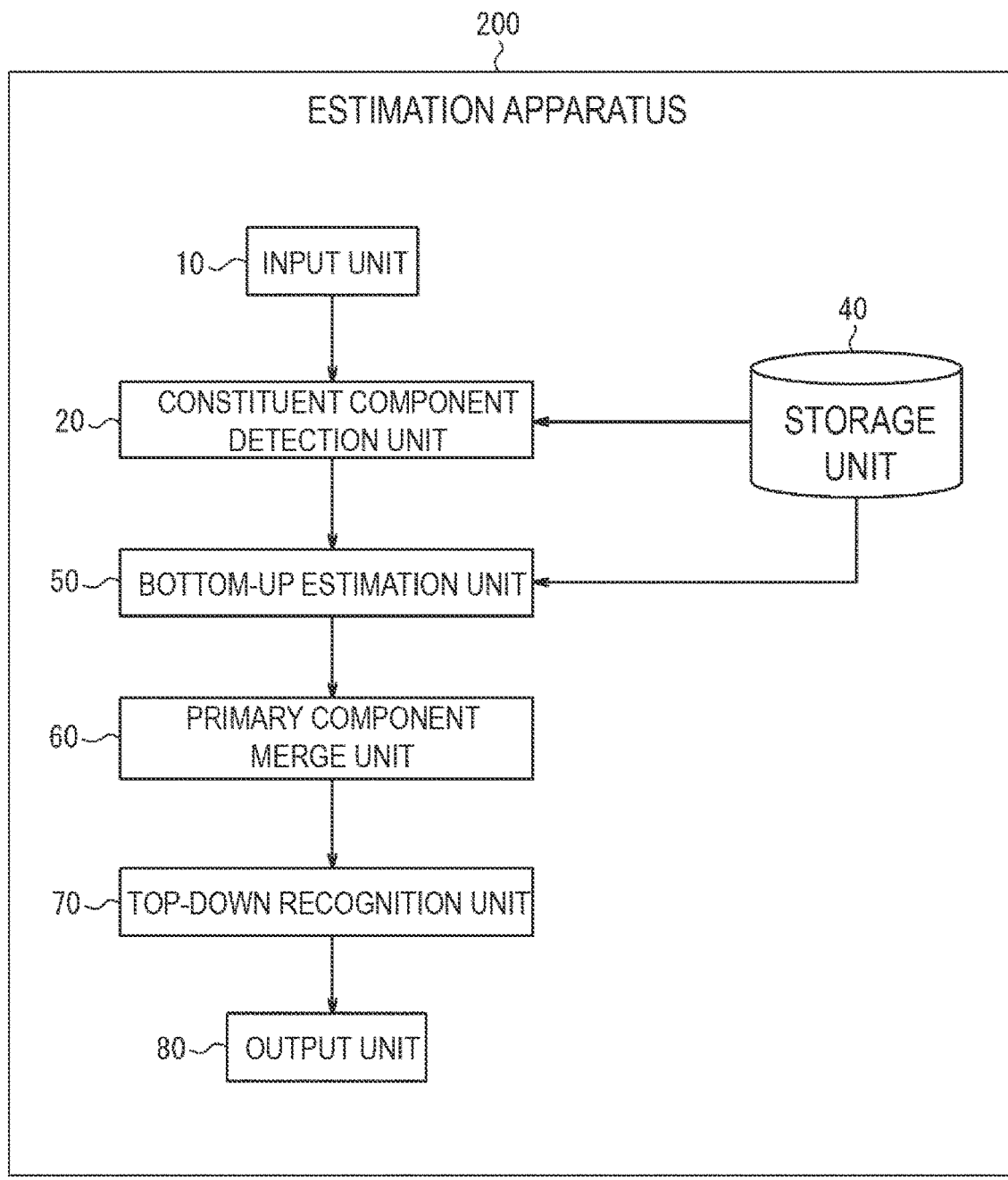
FIG. 8 is a diagram illustrating an example of a configuration of an estimation apparatus according to a second embodiment.

As illustrated in FIG. 8, the estimation apparatus 200 includes the input unit 10, the constituent component detection unit 20, the storage unit 40, the bottom-up estimation unit 50, the primary component merge unit 60, the top-down recognition unit 70, and the output unit 80. Note that, repeated descriptions the same configuration as the learning apparatus 100 may be omitted.

The estimation apparatus 200 is an apparatus, for example, constituted by a known or dedicated computer including a central processing unit (CPU), a main memory (random access memory (RAM)), and the like into which a prescribed program is read. For example, the estimation apparatus 200 executes each process under control of the central processing unit. Data input to the estimation apparatus 200 and data obtained in each process are, for example, stored in the main memory, and the data stored in the main memory is read out as needed to the central processing unit to be used for other processes. At least some of processing units of the estimation apparatus 200 may include hardware such as an integrated circuit. Each storage unit included in the estimation apparatus 200 can include, for example, a main memory such as a RAM, or middleware such as a relational database or a key-value store. However, each storage unit does not need to be provided inside the estimation apparatus 200, and may be constituted by an auxiliary storage device including a hard disk, an optical disk, or a semiconductor memory element such as a flash memory and may be provided outside the estimation apparatus 200.

The input unit 10 acquires a new image, a primary component adoption threshold $V_{th1}$, a candidate creation threshold $V_{th2}$, a candidate adoption threshold $V_{th3}$, a candidate merge threshold $V_{th4}$, and a secondary component selection threshold $V_{th5}$, and provides the acquired information to the constituent component detection unit 20, the bottom-up estimation unit 50, the primary component merge unit 60, and the top-down recognition unit 70 as inputs.

Figure 9:
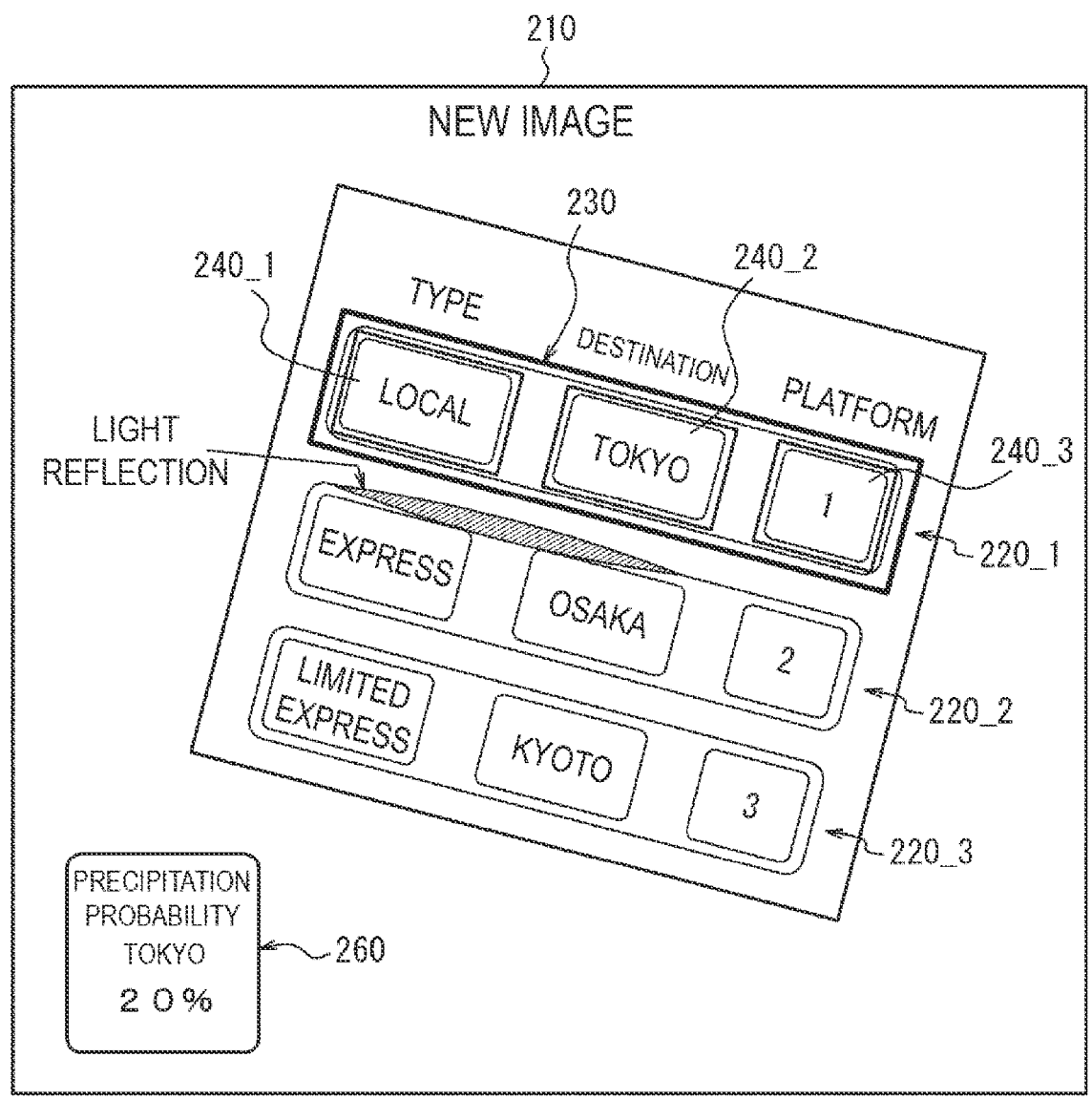
FIG. 9 is a diagram illustrating an example of a new image input to the estimation apparatus according to the second embodiment.

As illustrated in FIG. 9, a new image 210 contains a plurality of regular constituent objects 220 (220_1, 220_1, 220_3), and a non-regular constituent object 260. The regular constituent object 220 is, for example, a destination indicator. The non-regular constituent object 260 is, for example, an image indicating weather forecast. Note that a part of an outer frame of the regular constituent object 220_2 is hidden because of a reflection of light or the like.

In the regular constituent object 220_1, for example, a name of a primary group is "destination display", and a label of a primary component 230 belonging to the "destination display" group is "destination display." In the regular constituent object 220_1, for example, a name of a secondary group is "type", and a label of a secondary component 240_1 belonging to the "type" group is "local". In the regular constituent object 220_1, for example, a name of a secondary group is "destination", and a label of a secondary component 240_2 belonging to the "destination" group is "Tokyo". In the regular constituent object 220_1, for example, a name of a secondary group is "platform", and a label of a secondary component 240_3 belonging to the "platform" group is "1".

The constituent component detection unit 20 uses the detection model learned by the learning apparatus 100 to detect, based on the new image 210, coordinates of a region of a primary component contained in the new image 210, a label of the primary component contained in the new image 210, and a score of the primary component contained in the new image 210, and coordinates of a region of a secondary component contained in the new image 210, a label of the secondary component contained in the new image 210, and a score of the secondary component contained in the new image 210. The constituent component detection unit 20 generates a constituent component detection result list illustrated in Table 9 corresponding to an example of a constituent component result illustrated in Table 8. The constituent component detection unit 20 outputs the generated component detection result list to the bottom-up estimation unit 50.

TABLE 8

| Region | Label | Score |
|---|---|---|
| $(cx_1, cy_1, w_1, h_1)$ | Destination Display | $score_1$ |
| $(cx_2, cy_2, w_2, h_2)$ | Local | $score_2$ |
| $(cx_3, cy_3, w_3, h_3)$ | Tokyo | $score_3$ |
| $(cx_4, cy_4, w_4, h_4)$ | 1 | $score_4$ |
| . | . | . |
| . | . | . |
| . | . | . |

TABLE 9

| Number | Region | Label | Score |
|---|---|---|---|
| 1 | (0.57, 0.4, 0.29, 0.14) | Destination Display | 1.0 |
| 2 | (0.58, 0.58, 0.3, 0.12) | Destination Display | 1.0 |
| 3 | (0.6, 0.4, 0.12, 0.1) | Tokyo | 1.0 |
| 4 | (0.7, 0.59, 0.05, 0.07) | 3 | 0.99 |

TABLE 9-continued

| Number | Region | Label | Score |
|---|---|---|---|
| 5 | (0.49, 0.57, 0.11, 0.1) | Limited Express | 0.99 |
| 6 | (0.6, 0.49, 0.12, 0.09) | Osaka | 0.98 |
| 7 | (0.61, 0.58, 0.13, 0.09) | Kyoto | 0.95 |
| 8 | (0.49, 0.47, 0.11, 0.09) | Express | 0.87 |
| 9 | (0.69, 0.51, 0.05, 0.07) | 2 | 0.59 |
| 10 | (0.48, 0.38, 0.1, 0.09) | Local | 0.23 |
| 11 | (0.69, 0.43, 0.05, 0.06) | 1 | 0.2 |
| 12 | (0.21, 0.75, 0.17, 0.08) | Tokyo | 0.1 |
| 13 | (0.23, 0.89, 0.09, 0.09) | 2 | 0.1 |

As illustrated in Table 8, the coordinates of the region of the primary component 230 contained in the new image 210 are represented by $(cx_1, cy_1, w_1, h_1)$, the label of the primary component 230 contained in the new image 210 is represented by "destination display", and the score of the primary component 230 contained in the new image 210 is represented by "$score_1$". The score "$score_1$" represents the probability that the primary component 230 is present in the region of the primary component 230. The coordinates of the region of the secondary component 240_1 contained in the new image 210 are represented by $(cx_2, cy_2, w_2, h_2)$, the label of the secondary component 240_1 contained in the new image 210 is represented by "local", and the score of the secondary component 240_1 contained in the new image 210 is represented by "$score_2$". The score "$score_2$" represents the probability that secondary component 240_1 is present in the region of secondary component 240_1. The coordinates of the region of the secondary component 240_2 contained in the new image 210 are represented by $(cx_3, cy_3, w_3, h_3)$, the label of the secondary component 240_2 contained in the new image 210 is represented by "Tokyo", and the score of the secondary component 240_2 contained in the new image 210 is represented by "$score_3$". The score "$score_3$" represents the probability that secondary component 240_2 is present in the region of secondary component 240_2. The coordinates of the region of the secondary component 240_3 contained in the new image 210 are represented by $(cx_4, cy_4, w_4, h_4)$, the label of the secondary component 240_3 contained in the new image 210 is represented by "1", and the score of the secondary component 240_3 contained in the new image 210 is represented by "$score_4$". The score "$score_4$" represents the probability that secondary component 240_3 is present in the region of secondary component 240_3.

As illustrated in Table 9, the primary component contained in the regular constituent object 220_1 (the constituent component indicated by 'NO. 1') and the primary component contained in the regular constituent object 220_3 (the constituent component indicated by 'NO. 2') are detected, whereas the primary component contained in the regular constituent object 220_2 is not detected because a part of the outer frame of the regular constituent object 220_2 is hidden due to a reflection of light or the like. Components (a constituent component indicated by 'NO. 12' and a constituent component indicated by 'NO. 13') contained in the non-regular constituent object 260 (the image indicating the weather forecast) are detected.

The bottom-up estimation unit 50 estimates, based on the constituent component detection result list, the constituent component model, the primary component adoption threshold $V_{th1}$, the candidate creation threshold $V_{th2}$, and the candidate adoption threshold $V_{th3}$, the first primary component candidates by using Algorithm 2 illustrated in FIG. 10, for example, and generates a first primary component candidate list illustrated in Table 11 corresponding to an example of the primary component illustrated in Table 10. Herein, the first primary component candidates are constituent components collectively referring to the primary component and the plurality of secondary components contained in estimated regular constituent object candidates. The bottom-up estimation unit 50 generates the first primary component candidate list including nine first primary component candidates, for example. The bottom-up estimation unit 50 outputs the generated first primary component candidate list to the primary component merge unit 60. Note that the primary component adoption threshold $V_{th1}$, the candidate creation threshold $V_{th2}$, and the candidate adoption threshold $V_{th3}$ have values arbitrarily set, and, for example, the primary component adoption threshold $V_{th1}$ may be 0.25, the candidate creation threshold $V_{th2}$ may be 0.5, and the candidate adoption threshold $V_{th3}$ may be 0.5, and so on.

TABLE 10

| Component Group Name | Region | Label | Score |
|---|---|---|---|
| Destination Display | $(cx^{destination\ display}, cy^{destination\ display}, w^{destination\ display}, h^{destination\ display})$ | | |
| Type | $(cx^{type}, cy^{type}, w^{type}, h^{type})$ | | |
| Destination | $(cx^{destination}, cy^{destination}, w^{destination}, h^{destination})$ | | |
| Platform | $(cx^{platform}, cy^{platform}, w^{platform}, h^{platform})$ | | |

TABLE 11

| Number | Component Group Name | Region | Label | Score |
|---|---|---|---|---|
| 1 | Destination Display | (0.57, 0.4, 0.29, 0.14) | Destination Display | 1.0 |
| | Type | | | |
| | Destination Platform | | | |
| 2 | Destination Display | (0.58, 0.58, 0.3, 0.12) | Destination Display | 1.0 |
| | Type | | | |
| | Destination Platform | | | |
| 3 | Destination Display | (0.57, 0.4, 0.25, 0.13) | | 1.0 |
| | Type | | | |
| | Destination Platform | (0.6, 0.4, 0.12, 0.1) | Tokyo | 1.0 |
| 4 | Destination Display | (0.56, 0.57, 0.33, 0.13) | | 0.99 |
| | Type | | | |
| | Destination Platform | (0.7, 0.59, 0.05, 0.07) | 3 | 0.99 |
| 5 | Destination Display | (0.58, 0.58, 0.28, 0.14) | | 0.99 |
| | Type | (0.49, 0.57, 0.11, 0.1) | Limited Express | 0.99 |
| | Destination Platform | | | |
| 6 | Destination Display | (0.58, 0.48, 0.26, 0.12) | | 0.98 |
| | Type | | | |
| | Destination Platform | (0.6, 0.49, 0.12, 0.09) | Osaka | 0.98 |
| 7 | Destination Display | (0.58, 0.57, 0.29, 0.11) | | 0.95 |
| | Type | | | |
| | Destination Platform | (0.61, 0.58, 0.13, 0.09) | Kyoto | 0.95 |
| 8 | Destination Display | (0.58, 0.48, 0.3, 0.13) | | 0.87 |
| | Type | (0.49, 0.47, 0.11, 0.09) | Express | 0.87 |
| | Destination Platform | | | |

TABLE 11-continued

| Number | Component Group Name | Region | Label | Score |
|---|---|---|---|---|
| 9 | Destination Display Type | (0.56, 0.49, 0.31, 0.13) | | 0.59 |
| | Destination Platform | (0.69, 0.51, 0.05, 0.07) | 2 | 0.59 |

As illustrated in Table 10, in a case that the name of the primary group is "destination display," the coordinates ($cx^{destination\ display}$, $cy^{destination\ display}$, $w^{destination\ display}$, $h^{destination\ display}$) of the region of the primary component belonging to the "destination display" group is registered with a field for the coordinates of the region of the primary component belonging to the "destination display" group, the label of the primary component belonging to the "destination display" group is registered with a field for the label, and the score of the primary component belonging to the "destination display" group is registered with a field for the score. In a case that the name of the secondary group is "type", the coordinates ($cx^{type}$, $cy^{type}$, $w^{type}$, $h^{type}$) of the region of the secondary component belonging to the "type" group is registered with a field for the coordinates of the region of the secondary component belonging to the "type" group, the label of the secondary component belonging to the "type" group is registered with a field for the label, and the score of the secondary component belonging to the "type" group is registered with a field for the score. In a case that the name of the secondary group is "destination", the coordinates ($cx^{destination}$, $cy^{destination}$, $w^{destination}$, $h^{destination}$) of the region of the secondary component belonging to the "destination" group is registered with a field for the coordinates of the region of the secondary component belonging to the "destination" group, the label of the secondary component belonging to the "destination" group is registered with a field for the label, and the score of the secondary component belonging to the "destination" group is registered with a field for the score. In a case that the name of the secondary group is "platform", the coordinates ($cx^{platform}$, $cy^{platform}$, $w^{platform}$, $h^{platform}$) of the region of the secondary component belonging to the "platform" group is registered with a field for the coordinates of the region of the secondary component belonging to the "platform" group, the label of the secondary component belonging to the "platform" group is registered with a field for the label, and the score of the secondary component belonging to the "platform" group is registered with a field for the score.

For example, the bottom-up estimation unit 50 determines that the constituent components indicated by 'NO. 1' and 'NO. 2' are primary components on the basis that the labels of the constituent components indicated by 'NO. 1' and 'NO. 2' in the constituent component detection result list illustrated in Table 9 are labels of the primary components. Then, the bottom-up estimation unit 50 determines whether or not the scores of the constituent components indicated by 'NO. 1' and 'NO. 2' in the constituent component detection result list illustrated in Table 9 are equal to or more than the primary component adoption threshold $V_{th1}$.

In a case that the bottom-up estimation unit 50 determines that the scores of the constituent components indicated by 'NO. 1' and 'NO. 2' in the constituent component detection result list illustrated in Table 9 are equal to or more than the primary component adoption threshold $V_{th1}$, the bottom-up estimation unit 50 registers the constituent component indicated by 'NO. 1' with the first primary component candidate for 'NO. 1' in the first primary component candidate list illustrated in Table 11 and registers the constituent component indicated by 'NO. 2' with the first primary component candidate for 'NO. 2' in the first primary component candidate list illustrated in Table 11.

Specifically, in this case, the bottom-up estimation unit 50 registers the coordinates of the regions, labels, and scores of the constituent components indicated by 'NO. 1' and 'NO. 2' in the constituent component detection result list illustrated in Table 9 with fields for the coordinates of the regions of the primary components belonging to the "destination display" group for the first primary component candidates for 'NO. 1' and 'NO. 2' in the first primary component candidate list illustrated in Table 11, fields for the labels of the primary components belonging to the "destination display" group, and fields for the scores of the primary components belonging to the "destination display" group, respectively. The bottom-up estimation unit 50 sets null in fields for the coordinates of the regions of the secondary components belonging to the "type," "destination," and "platform" groups corresponding to the first constituent component candidates for 'NO. 1' and 'NO. 2' in the first primary component candidate list illustrated in Table 11, fields for the labels of the secondary components belonging to the "type," "destination," and "platform" groups, and fields for the scores of the secondary components belonging to the "type," "destination," and "platform" groups.

In a case that the bottom-up estimation unit 50 determines that the scores of the constituent components indicated by 'NO. 1' and 'NO. 2' in the constituent component detection result list illustrated in Table 9 are less than the primary component adoption threshold $V_{th1}$, the bottom-up estimation unit 50 does not register the constituent components indicated by 'NO. 1' and 'NO. 2' with the first primary component candidates for 'NO. 1' and 'NO. 2' in the first primary component candidate list illustrated in Table 11.

Specifically, in this case, the bottom-up estimation unit 50 sets null in the fields for the coordinates of the region of the primary component belonging to the "destination display" group for the first primary component candidates for 'NO. 1' and 'NO. 2' in the first primary component candidate list illustrated in Table 11, the fields for the labels of the primary components belonging to the "destination display" group, and the fields for the scores of the primary components belonging to the "destination display" group.

For example, the bottom-up estimation unit 50 determines that the constituent components indicated by 'NO. 3' to 'NO. 9' are secondary components on the basis that the labels of the constituent components indicated by 'NO. 3' to 'NO. 9' in the constituent component detection result list illustrated in Table 9 are labels of the secondary components. Then, the bottom-up estimation unit 50 determines whether or not the scores of the constituent components indicated by 'NO. 3' to 'NO. 9' in the constituent component detection result list illustrated in Table 9 are equal to or more than the candidate creation threshold $V_{th2}$.

In a case that the bottom-up estimation unit 50 determines that the scores of the constituent components indicated by 'NO. 3' to 'NO. 9' in the constituent component detection result list illustrated in Table 9 are equal to or more than the candidate creation threshold $V_{th2}$, the bottom-up estimation unit 50 assumes that the constituent components indicated by 'NO. 3' to 'NO. 9' are constituent components for which the first primary component candidates are to be created, and estimates the primary component candidates from the constituent components indicated by 'NO. 3' to 'NO. 9'. Then, the bottom-up estimation unit 50 determines whether or not the estimated scores are equal to or more than the candidate adoption threshold $V_{th3}$. Although numerical values are omitted, all of the estimated scores for 'NO. 3' to 'NO. 9' are equal to or more than the candidate adoption threshold $V_{th3}$. Therefore, the bottom-up estimation unit 50 registers the constituent components indicated by 'NO. 3' to 'NO. 9' with secondary components corresponding to the first primary component candidates for 'NO. 3' to 'NO. 9' in the first primary component candidate list illustrated in Table 11.

Specifically, in this case, the bottom-up estimation unit 50 registers the coordinates of the regions, labels, and scores of the constituent components indicated by 'NO. 3' to 'NO. 9' in the constituent component detection result list illustrated in Table 9 with fields for the coordinates of the regions of the secondary components belonging to the "type," "destination," and "platform" groups corresponding to the first constituent component candidates for 'NO. 3' to 'NO. 9' in the first primary component candidate list illustrated in Table 11, fields for the labels of the secondary components belonging to the "type," "destination," and "platform" groups, and fields for the scores of the secondary components belonging to the "type," "destination," and "platform" groups. The bottom-up estimation unit 50 sets the coordinates of the regions of the estimated primary components in the fields for the coordinates of the regions of the primary components belonging to the "destination display" group for the first primary component candidates for 'NO. 3' to 'NO. 9' in the first primary component candidate list illustrated in Table 11, sets null in the fields for the labels of the primary components belonging to the "destination display" group, and sets the scores of the constituent components in the fields for the scores of the primary components belonging to the "destination display" group.

For example, the bottom-up estimation unit 50 determines that the constituent components indicated by 'NO. 10' to 'NO. 13' are secondary components on the basis that the labels of the constituent components indicated by 'NO. 10' to 'NO. 13' in the constituent component detection result list illustrated in Table 9 are labels of the secondary components. Then, the bottom-up estimation unit 50 determines whether or not the scores of the constituent components indicated by 'NO. 10' to 'NO. 13' in the constituent component detection result list illustrated in Table 9 are equal to or more than the candidate creation threshold $V_{th2}$.

In a case that the bottom-up estimation unit 50 determines that the scores of the constituent components indicated by 'NO. 10' to 'NO. 13' in the constituent component detection result list illustrated in Table 9 are less than the candidate creation threshold $V_{th2}$, the bottom-up estimation unit 50 assumes that the constituent components indicated by 'NO. 10' to 'NO. 13' are constituent components for which the first primary component candidates are not to be created, and does not register the constituent components indicated by 'NO. 10' to 'NO. 13' with the first primary component candidate list illustrated in Table 11.

Specifically, in this case, the bottom-up estimation unit 50 sorts out the constituent components indicated by 'NO. 10' to 'NO. 13' in the constituent component detection result list illustrated in Table 9 as the secondary components that are not registered with the first primary component candidate list illustrated in Table 11.

Then, the bottom-up estimation unit 50 creates a secondary component list illustrated in Table 13 corresponding to an example of the secondary component illustrated in Table 12, based on a plurality of sorted out secondary components (e.g., the constituent components indicated by 'NO. 10' to 'NO. 13' in the constituent component detection result list illustrated in Table 9). The bottom-up estimation unit 50 generates the secondary component list including four secondary components, for example. The bottom-up estimation unit 50 outputs the generated secondary component list to the primary component merge unit 60.

TABLE 12

| Region | Label | Score |
| --- | --- | --- |
| (cx, cy, w, h) | | |

TABLE 13

| Number | Region | Label | Score |
| --- | --- | --- | --- |
| 1 | (0.48, 0.38, 0.1, 0.09) | Local | 0.23 |
| 2 | (0.69, 0.43, 0.05, 0.06) | 1 | 0.2 |
| 3 | (0.21, 0.75, 0.17, 0.08) | Tokyo | 0.1 |
| 4 | (0.23, 0.89, 0.09, 0.09) | 2 | 0.1 |

As illustrated in Table 12, the coordinates (cx, cy, w, h) of the region of the secondary component is registered with a field for the coordinates of the region of the secondary component, the label of the secondary component is registered with a field for the label of the secondary component, and the score of the secondary component is registered with a field for the score of the secondary component.

For example, the bottom-up estimation unit 50 registers the coordinates (0.48, 0.38, 0.1, 0.09) of the region, the label "local", and the score "0.23" of the constituent component indicated by 'NO. 0' in the constituent component detection result list illustrated in Table 9 with a field for the coordinates of the region, a field for the label, and a field for the score of the secondary component indicated by 'NO. 1' in the secondary component list illustrated in Table 13.

For example, the bottom-up estimation unit 50 registers the coordinates (0.69, 0.43, 0.05, 0.06) of the region, the label "1", and the score "0.2" of the constituent component indicated by 'NO. 11' in the constituent component detection result list illustrated in Table 9 with a field for the coordinates of the region, a field for the label, and a field for the score of the secondary component indicated by 'NO. 2' in the secondary component list illustrated in Table 13.

For example, the bottom-up estimation unit 50 registers the coordinates (0.21, 0.75, 0.17, 0.08) of the region, the label "Tokyo", and the score "0.1" of the constituent component indicated by 'NO. 12' in the constituent component detection result list illustrated in Table 9 with a field for the coordinates of the region, a field for the label, and a field for the score of the secondary component indicated by 'NO. 3' in the secondary component list illustrated in Table 13.

For example, the bottom-up estimation unit 50 registers the coordinates (0.23, 0.89, 0.09, 0.09) of the region, the label "2", and the score "0.1" of the constituent component indicated by 'NO. 13' in the constituent component detection result list illustrated in Table 9 with a field for the coordinates of the region, a field for the label, and a field for the score of the secondary component indicated by 'NO. 4' in the secondary component list illustrated in Table 13.

The primary component merge unit 60 merges, based on the first primary component candidate list and the candidate merge threshold $V_{th4}$, the plurality of first primary component candidates by using Algorithm 3 illustrated in FIG. 11, for example, removes an unnecessary first primary component candidate, and generate a second primary component candidate list illustrated in Table 14. Herein, second primary component candidates are constituent components collectively referring to the primary component and the plurality of secondary components contained in merged regular constituent object candidates. The primary component merge unit 60 generates the second primary component candidate list including three second component candidates, for example. The primary component merge unit 60 outputs the generated second component candidate list to the top-down recognition unit 70. Note that the candidate merge threshold $V_{th4}$ has a value arbitrarily set, and, for example, the candidate merge threshold $V_{th4}$ may be 0.4, and so on.

TABLE 14

| Number | Component Group Name | Region | Label | Score |
|---|---|---|---|---|
| 1 | Destination Display Type | (0.57, 0.4, 0.27, 0.14) | Destination Display | 2.0 |
|  | Destination Platform | (0.6, 0.4, 0.12, 0.1) | Tokyo | 1.0 |
| 2 | Destination Display Type | (0.58, 0.58, 0.3, 0.12) | Destination Display | 3.93 |
|  |  | (0.7, 0.59, 0.05, 0.07) | Limited Express | 0.99 |
|  | Destination Platform | (0.61, 0.58, 0.13, 0.09) | Kyoto | 0.96 |
|  |  | (0.7, 0.59, 0.05, 0.07) | 3 | 0.99 |
| 3 | Destination Display Type | (0.58, 0.49, 0.29, 0.13) |  | 2.44 |
|  |  | (0.49, 0.47, 0.11, 0.09) | Express | 0.87 |
|  | Destination Platform | (0.6, 0.49, 0.12, 0.09) | Osaka | 0.98 |
|  |  | (0.69, 0.51, 0.05, 0.07) | 2 | 0.59 |

First, the primary component merge unit 60 determines whether or not the score of each constituent component in the first primary component candidate list illustrated in Table 11 is equal to or more than the candidate merge threshold $V_{th4}$. In a case that the primary component merge unit 60 determines that the score of each constituent component in the first primary component candidate list illustrated in Table 11 is equal to or more than the candidate merge threshold $V_{th4}$, the primary component merge unit 60 merges the plurality of first primary component candidates. In a case that the primary component merge unit 60 determines that the score of each constituent component in the first primary component candidate list illustrated in Table 11 is less than the candidate merge threshold $V_{th4}$, the primary component merge unit 60 does not merge the plurality of first primary component candidates.

In the case that the primary component merge unit 60 determines that the score of each constituent component is equal to or more than the candidate merge threshold $V_{th4}$, the primary component merge unit 60 compares the coordinates of the regions of the respective first primary component candidates belonging to the "destination display" group in the first primary component candidate list illustrated in Table 11, calculates an Intersection over Union (IoU) between the regions (the intersection of two regions/the union of two regions), and determines a plurality of first primary component candidates to be merged. Then, the primary component merge unit 60 adds the scores of the plurality of first primary component candidates determined to calculate an integrated score. For example, the primary component merge unit 60 calculates a sum of the score of the first primary component candidate indicated by 'NO. 1' and the score of the first primary component candidate indicated by 'NO. 3' in the first primary component candidate list illustrated in Table 11. For example, the primary component merge unit 60 calculates a sum of the score of the first primary component candidate indicated by 'NO. 2', the score of the first primary component candidate indicated by 'NO. 4', the score of the first primary component candidate indicated by 'NO. 5', and the score of the first primary component candidate indicated by 'NO. 7' in the first primary component candidate list illustrated in Table 11. For example, the primary component merge unit 60 calculates a sum of the score of the first primary component candidate indicated by 'NO. 6', the score of the first primary component candidate indicated by 'NO. 8', and the score of the first primary component candidate indicated by 'NO. 9' in the first primary component candidate list illustrated in Table 11.

Next, the primary component merge unit 60 multiplies the score of each first primary component candidate and the coordinates of the region of each first primary component candidate and divides a sum of these by the integrated score to calculate coordinates of an integrated region. For example, the primary component merge unit 60 calculates coordinates of an integrated region of the first primary component candidate indicated by 'NO. 1' and the first primary component candidate indicated by 'NO. 3' in the first primary component candidate list illustrated in Table 11. For example, the primary component merge unit 60 calculates coordinates of an integrated region of the first primary component candidate indicated by 'NO. 2', the first primary component candidate indicated by 'NO. 4', the first primary component candidate indicated by 'NO. 5', and the first primary component candidate indicated by 'NO. 7' in the first primary component candidate list illustrated in Table 11. For example, the primary component merge unit 60 calculates coordinates of an integrated region of the first primary component candidate indicated by 'NO. 6', the first primary component candidate indicated by 'NO. 8', and the first primary component candidate indicated by 'NO. 9' in the first primary component candidate list illustrated in Table 11.

Next, the primary component merge unit 60 registers the calculated coordinates of the integrated region with a field for the coordinates of the region of the second primary component candidate in the second primary component candidate list illustrated in Table 14, registers the label of the first primary component candidate in the first primary component candidate list illustrated in Table 11 as it is with a field for the label, and registers the calculated sum of the scores of the plurality of first primary component candidates with a field for the score.

For example, the primary component merge unit 60 registers the coordinates of the integrated region calculated from the first primary component candidates indicated by 'NO. 1' and 'NO. 3' in the first primary component candidate list illustrated in Table 11, the label of the first primary component candidates indicated by 'NO. 1' and 'NO. 3' in the first primary component candidate list illustrated in Table 11, and the sum of the scores calculated from the first primary component candidates indicated by 'NO. 1' and 'NO. 3' in the first primary component candidate list illustrated in Table 11, in, respectively, a field for a region of a primary component, belonging to the "destination display" group, of the second primary component candidate indicated by 'NO. 1' in the second primary component candidate list illustrated in Table 14, a field for a label of the primary component belonging to the "destination display" group, and a field for a score of the primary component belonging to the "destination display" group.

For example, the primary component merge unit 60 registers the coordinates of the integrated region calculated from the first primary component candidates indicated by 'NO. 2,' 'NO. 4,' 'NO. 5,' and 'NO. 7' in the first primary component candidate list illustrated in Table 11, the label of the first primary component candidates indicated by 'NO. 2,' 'NO. 4,' 'NO. 5,' and 'NO. 7' in the first primary component candidate list illustrated in Table 11, and the sum of the scores calculated from the first primary component candidates indicated by 'NO. 2,' 'NO. 4,' 'NO. 5,' and 'NO. 7' in the first primary component candidate list illustrated in Table 11, in, respectively, a field for a region of a primary component, belonging to the "destination display" group, of the second primary component candidate indicated by 'NO. 2' in the second primary component candidate list illustrated in Table 14, a field for a label of the primary component belonging to the "destination display" group, and a field for a score of the primary component belonging to the "destination display" group.

For example, the primary component merge unit 60 registers the coordinates of the integrated region calculated from the first primary component candidates indicated by 'NO. 6,' 'NO. 8,' and 'NO. 9' in the first primary component candidate list illustrated in Table 11, the label of the first primary component candidates indicated by 'NO. 6,' 'NO. 8,' and 'NO. 9' in the first primary component candidate list illustrated in Table 11, and the sum of the scores calculated from the first primary component candidates indicated by 'NO. 6,' 'NO. 8,' and 'NO. 9' in the first primary component candidate list illustrated in Table 11, in, respectively, a field for a region of a primary component, belonging to the "destination display" group, of the second primary component candidate indicated by 'NO. 3' in the second primary component candidate list illustrated in Table 14, a field for a label of the primary component belonging to the "destination display" group, and a field for a score of the primary component belonging to the "destination display" group.

Next, the primary component merge unit 60 registers coordinates of regions, labels and scores of secondary components corresponding to a prescribed first primary component candidate in the first primary component candidate list illustrated in Table 11 as they are with fields for coordinates of regions, fields for labels, and fields of scores of a plurality of secondary components corresponding to the second primary component candidate in the second primary component candidate list illustrated in Table 14.

For example, the primary component merge unit 60 registers the coordinates of the region, label, and score of the secondary component belonging to the "destination" group corresponding to the first primary component candidate indicated by 'NO. 3' in the first primary component candidate list illustrated in Table 11 in fields for secondary components belonging to the "destination" group corresponding to the second primary component candidate indicated by 'NO. 1' in the second primary component candidate list illustrated in Table 14.

For example, the primary component merge unit 60 registers the coordinates of the region, label, and score of the secondary component belonging to the "type" group corresponding to the first primary component candidate indicated by 'NO. 5' in the first primary component candidate list illustrated in Table 11, the coordinates of the region, label, and score of the secondary component belonging to the "destination" group corresponding to the first primary component candidate indicated by 'NO. 7', and the coordinates of the region, label, and score of the secondary component belonging to the "platform" group corresponding to the first primary component candidate indicated by 'NO. 4', in, respectively, fields for secondary components belonging to the "type," "destination," and "platform" groups corresponding to the second primary component candidate indicated by 'NO. 2' in the second primary component candidate list illustrated in Table 14.

For example, the primary component merge unit 60 registers the coordinates of the region, label, and score of the secondary component belonging to the "type" group corresponding to the first primary component candidate indicated by 'NO. 8' in the first primary component candidate list illustrated in Table 11, the coordinates of the region, label, and score of the secondary component belonging to the "destination" group corresponding to the first primary component candidate indicated by 'NO. 6', and the coordinates of the region, label, and score of the secondary component belonging to the "platform" group corresponding to the first primary component candidate indicated by 'NO. 9', in, respectively, fields for secondary components belonging to the "type," "destination," and "platform" groups corresponding to the second primary component candidate indicated by 'NO. 3' in the second primary component candidate list illustrated in Table 14.

The top-down recognition unit 70 refers to the second primary component candidate list, the secondary component list, and the secondary component selection threshold $V_{th5}$ to select a secondary component matching the second primary component candidate from the secondary component list using Algorithm 4 illustrated in FIG. 12, for example, and registers the selected secondary component with the second primary component candidate. Then, the top-down recognition unit 70 generates a primary component and secondary component list illustrated in Table 15. The top-down recognition unit 70 generates a primary component and secondary component list including, for example, three regular constituent objects. The top-down recognition unit 70 outputs the generated primary component and secondary component list to the output unit 80. Note that the secondary component selection threshold $V_{th5}$ has a value arbitrarily set, and, for example, the secondary component selection threshold $V_{th5}$ may be 0.5, and so on.

TABLE 15

| Number | Component Group Name | Region | Label | Score |
|---|---|---|---|---|
| 1 | Destination Display | (0.57, 0.4, 0.27, 0.14) | Destination Display | 2.0 |
|  | Type | (0.48, 0.38, 0.1, 0.09) | Local | 0.23 |
|  | Destination | (0.6, 0.4, 0.12, 0.1) | Tokyo | 1.0 |
|  | Platform | (0.69, 0.43, 0.05, 0.06) | 1 | 0.2 |
| 2 | Destination Display | (0.58, 0.58, 0.3, 0.12) | Destination Display | 3.93 |
|  | Type | (0.7, 0.59, 0.05, 0.07) | Limited Express | 0.99 |
|  | Destination | (0.61, 0.58, 0.13, 0.09) | Kyoto | 0.96 |
|  | Platform | (0.7, 0.59, 0.05, 0.07) | 3 | 0.99 |
| 3 | Destination Display | (0.58, 0.49, 0.29, 0.13) |  | 2.44 |
|  | Type | (0.49, 0.47, 0.11, 0.09) | Express | 0.87 |
|  | Destination | (0.6, 0.49, 0.12, 0.09) | Osaka | 0.98 |
|  | Platform | (0.69, 0.51, 0.05, 0.07) | 2 | 0.59 |

The top-down recognition unit 70 calculates a matching ratio between the secondary component in the secondary component list illustrated in Table 13 and the second primary component candidate in the second primary component candidate list illustrate in Table 14, based on a ratio at which a prescribed secondary component is contained in a prescribed primary component. Then, the top-down recognition unit 70 determines whether or not the matching ratio is equal to or more than the secondary component selection threshold $V_{th5}$. The top-down recognition unit 70 selects a prescribed secondary component in the secondary component list illustrated in Table 13 and registers the selected secondary component with the second primary component candidate in a case that the matching ratio is equal to or more than the secondary component selection threshold $V_{th5}$. The top-down recognition unit 70 does not select any secondary component in a case that the matching ratio is less than the secondary component selection threshold $V_{th5}$.

For example, on the basis that the matching ratio between the secondary component indicated by 'NO. 1' in the secondary component list illustrated in Table 13 and the secondary component belonging to the "type" group indicated by 'NO. 1' in the second primary component candidate list illustrated in Table 14 is equal to or more than the secondary component selection threshold $V_{th5}$ (e.g., 0.5), the top-down recognition unit 70 registers data of the secondary component indicated by 'NO. 1' in the secondary component list illustrated in Table 13 in a field for a secondary component belonging to the "type" group contained in a regular constituent object indicated by 'NO. 1' in the primary component and secondary component list illustrated in Table 15.

For example, on the basis that the matching ratio between the secondary component indicated by 'NO. 2' in the secondary component list illustrated in Table 13 and the secondary component belonging to the "platform" group indicated by 'NO. 2' in the second primary component candidate list illustrated in Table 14 is equal to or more than the secondary component selection threshold $V_{th5}$ (e.g., 0.5), the top-down recognition unit 70 registers data of the secondary component indicated by 'NO. 2' in the secondary component list illustrated in Table 13 in a field for a secondary component belonging to the "platform" group contained in the regular constituent object indicated by 'NO. 1' in the primary component and secondary component list illustrated in Table 15.

For example, on the basis that the matching ratio between the secondary component indicated by 'NO. 3' in the secondary component list illustrated in Table 13 and each of all the secondary components belonging to the "type" group in the second primary component candidate list illustrated in Table 14 is less than the secondary component selection threshold $V_{th5}$ (e.g., 0.5), the top-down recognition unit 70 does not register data of the secondary component indicated by 'NO. 3' in the secondary component list illustrated in Table 13 with the primary component and secondary component list illustrated in Table 15.

For example, on the basis that the matching ratio between the secondary component indicated by 'NO. 4' in the secondary component list illustrated in Table 13 and each of all the secondary components belonging to the "platform" group in the second primary component candidate list illustrated in Table 14 is less than the secondary component selection threshold $V_{th5}$ (e.g., 0.5), the top-down recognition unit 70 does not register data of the secondary component indicated by 'NO. 4' in the secondary component list illustrated in Table 13 with the primary component and secondary component list illustrated in Table 15.

As a result, the primary component and secondary component list illustrated in Table 15 described above is generated. In the regular constituent object indicate by 'NO. 1' illustrated in Table 15, the coordinates of the region of the primary component belonging to the "destination display" group, the label of the primary component, and the score of the primary component, and the coordinates of the regions of the secondary components belonging to the "type," "destination," and "platform" groups, the label of the primary component, and the score of the primary component correspond to the regular constituent object 220_1, for example. In the regular constituent object indicate by 'NO. 2' illustrated in Table 15, the coordinates of the region of the primary component belonging to the "destination display" group, the label of the primary component, and the score of the primary component, and the coordinates of the regions of the secondary components belonging to the "type," "destination," and "platform" groups, the label of the primary component, and the score of the primary component correspond to the regular constituent object 220_2, for example. In the regular constituent object indicate by 'NO. 3' illustrated in Table 15, the coordinates of the region of the primary component belonging to the "destination display" group, the label of the primary component, and the score of the primary component, and the coordinates of the regions of the secondary components belonging to the "type," "destination," and "platform" groups, the label of the primary component, and the score of the primary component correspond to the regular constituent object 220_3, for example.

The output unit 80, based on the primary component and secondary component list illustrated in Table 15, outputs to a network, a file, or the like, the coordinates of the region of the primary component belonging to the "destination display" group, the labels of the secondary components belonging to the "type," "destination," and "platform" groups, the scores of the secondary components belonging to the "type," "destination," and "platform" groups, as recognition results. The recognition result is a result in which a plurality of regular constituent objects different in the combination of the constituent components are distinguished from each other according to a precise combination. For example, in the recognition result, the plurality of regular constituent objects 220 (220_1, 220_1, 220_3) are distinguished from each other in a precise combination and recognized, and the component containing the non-regular constituent object 260 is not recognized.

According to the estimation apparatus 200 in the present embodiment, the bottom-up estimation unit 50 estimates the first primary component candidate, based on the relationship between the position of the primary component and the positions of the plurality of secondary components contained in the regular constituent object. Accordingly, even in a case that the constituent component detection unit 20 cannot detect the primary component, an appropriate primary component can be estimated. The top-down recognition unit 70 selects a secondary component matching the second primary component candidate from among the plurality of secondary components, thereby, precisely determining a combination of the constituent components. The top-down recognition unit 70 removes secondary components that do not match the second primary component candidate from the components to be recognized, thereby, preventing a component not contained in the regular constituent object from being erroneously recognized.

According to the estimation apparatus 200 in the present embodiment, it is possible to recognize a regular constituent object with high accuracy without requiring a large amount of training data and without solving a combinatorial optimization problem for the all components.

Estimation Method

Figure 13:
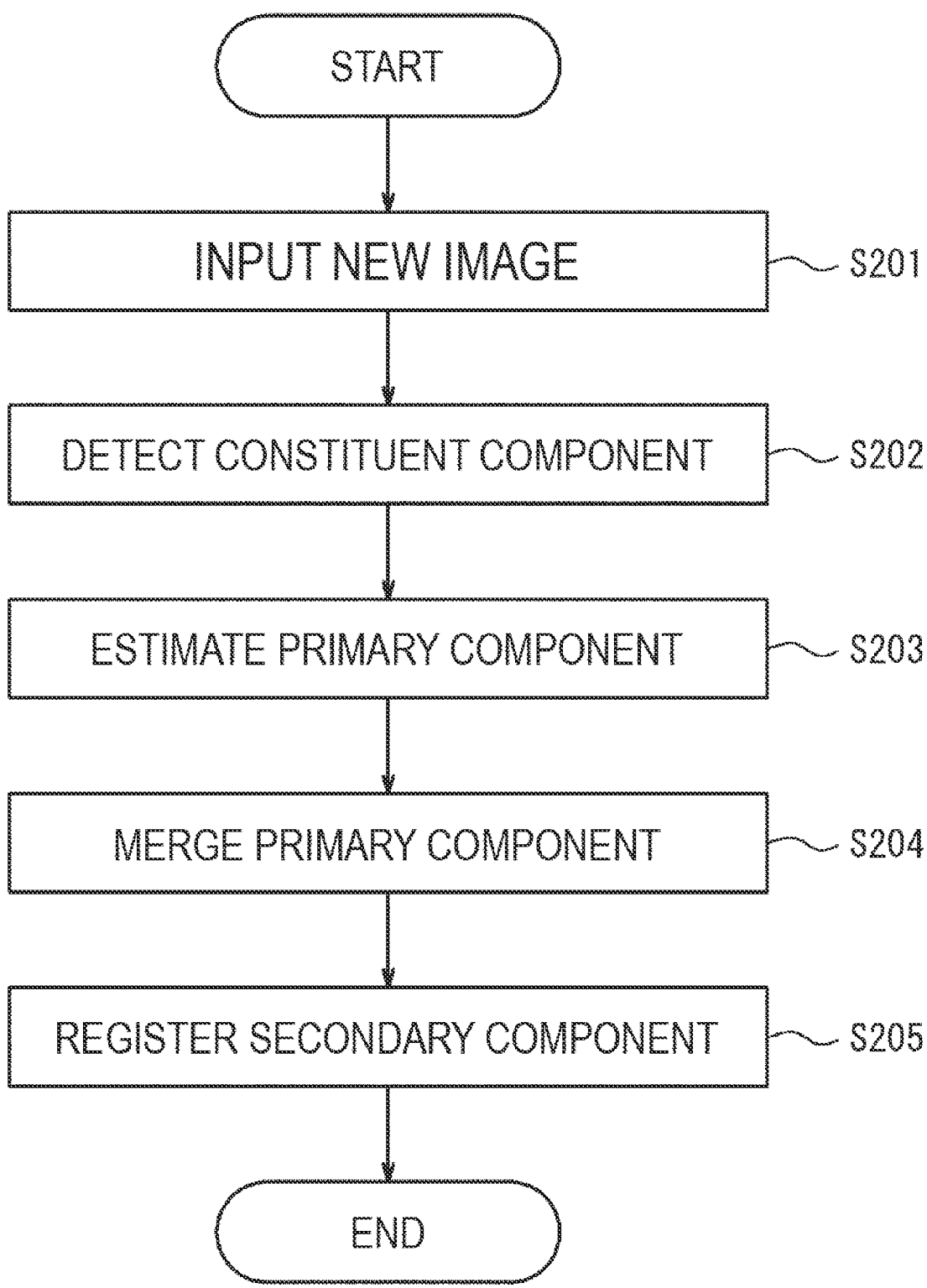
FIG. 13 is a flowchart illustrating an example of an estimating method according to the second embodiment.
Figure 17:
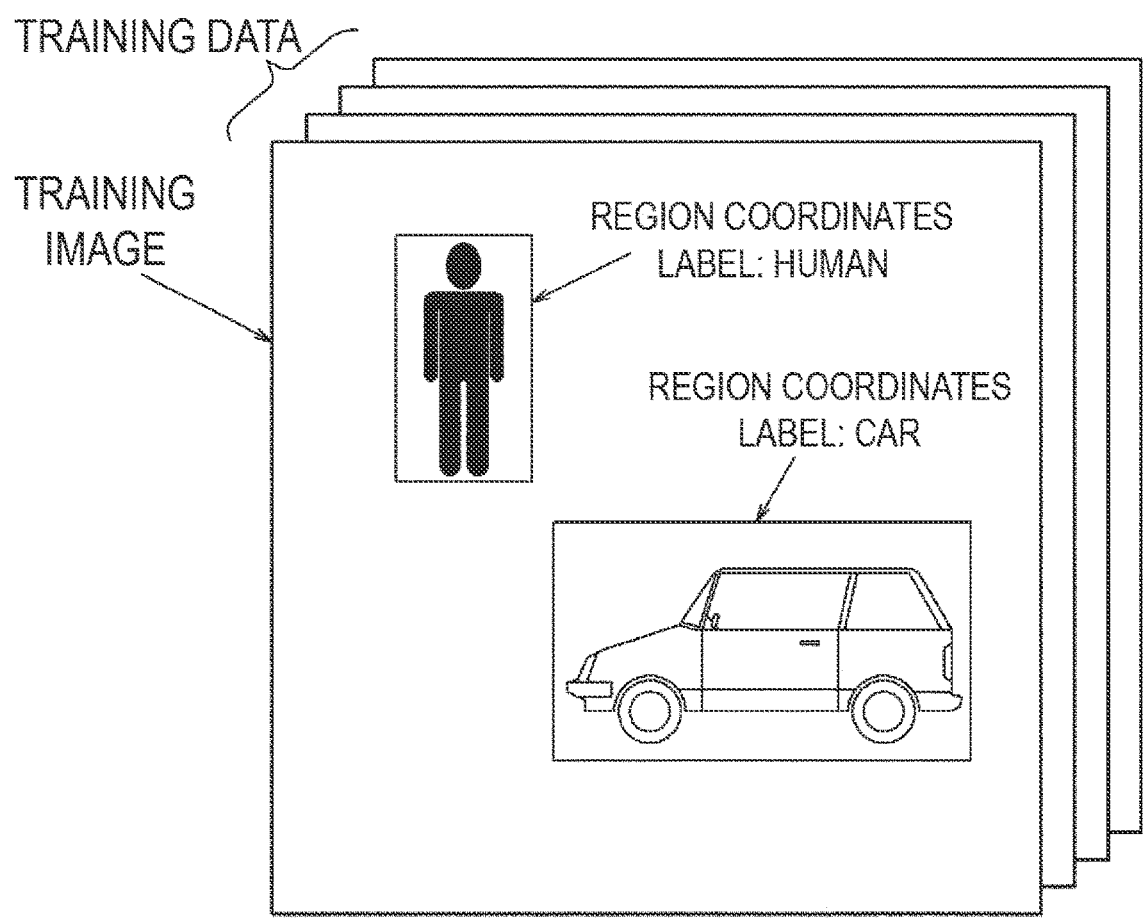
FIG. 17 is a diagram for describing an object recognition method of related art.
Figure 18:
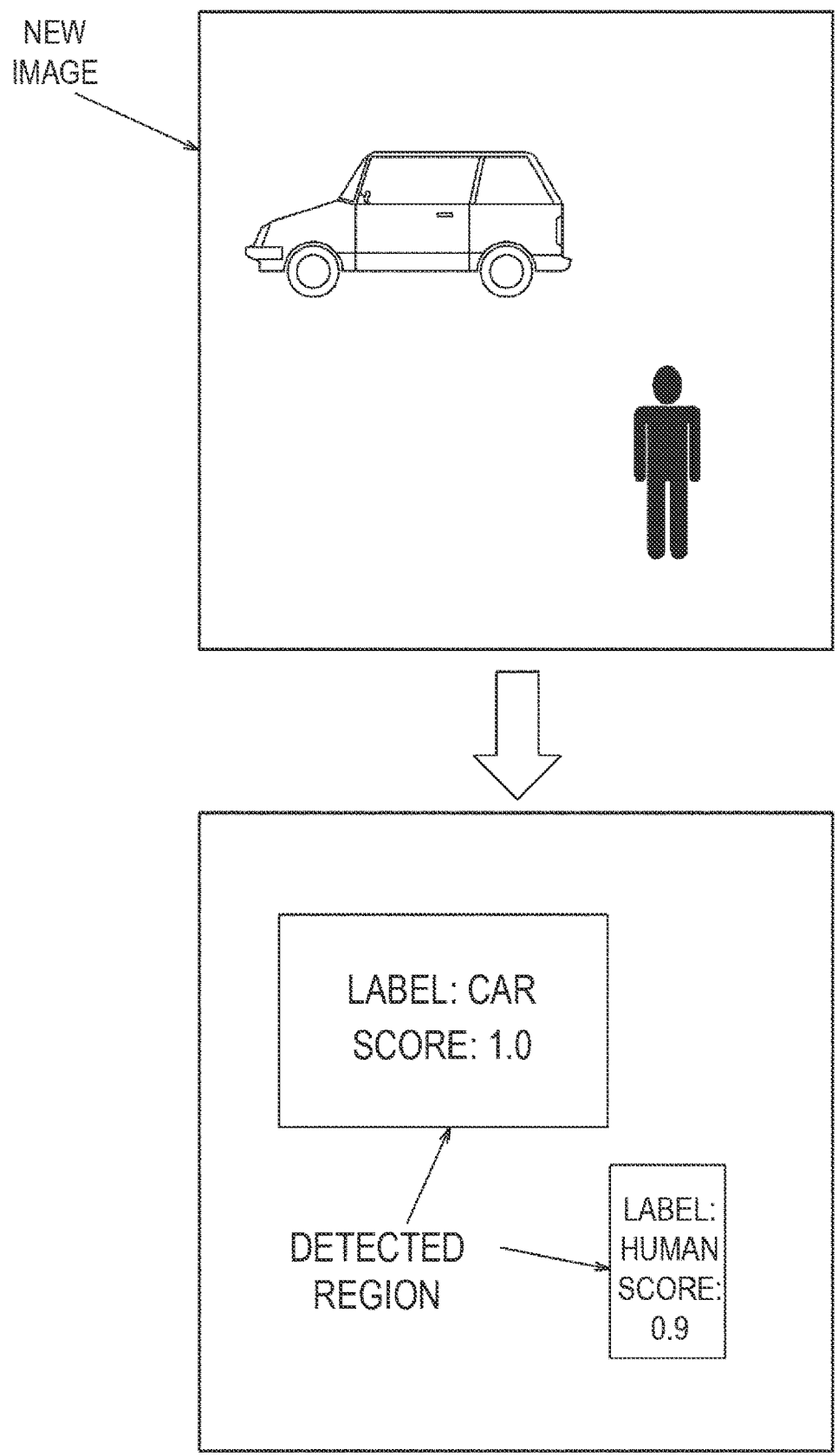
FIG. 18 is a diagram for describing an object recognition method of related art.
Figure 19:
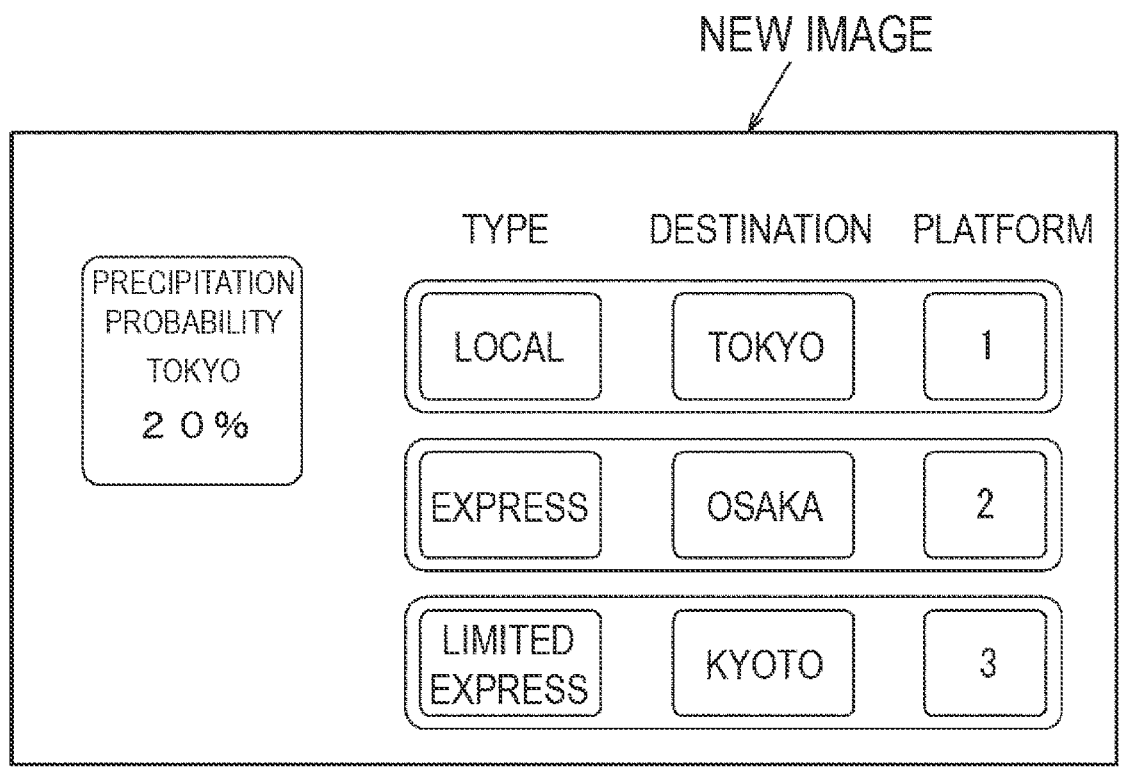
FIG. 19 is a diagram illustrating an example of a recognition target recognized by an object recognition method of related art.
Figure 20:
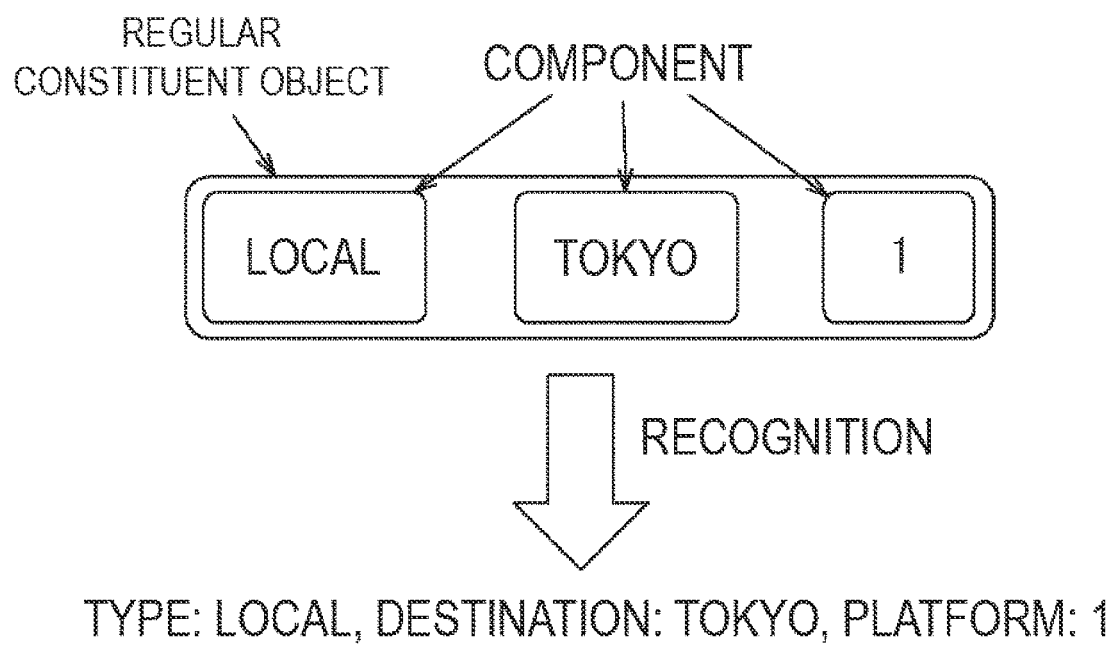
FIG. 20 is a diagram illustrating an example of a regular constituent object recognized by an object recognition method of related art and components contained in the regular constituent object.
Figure 21:
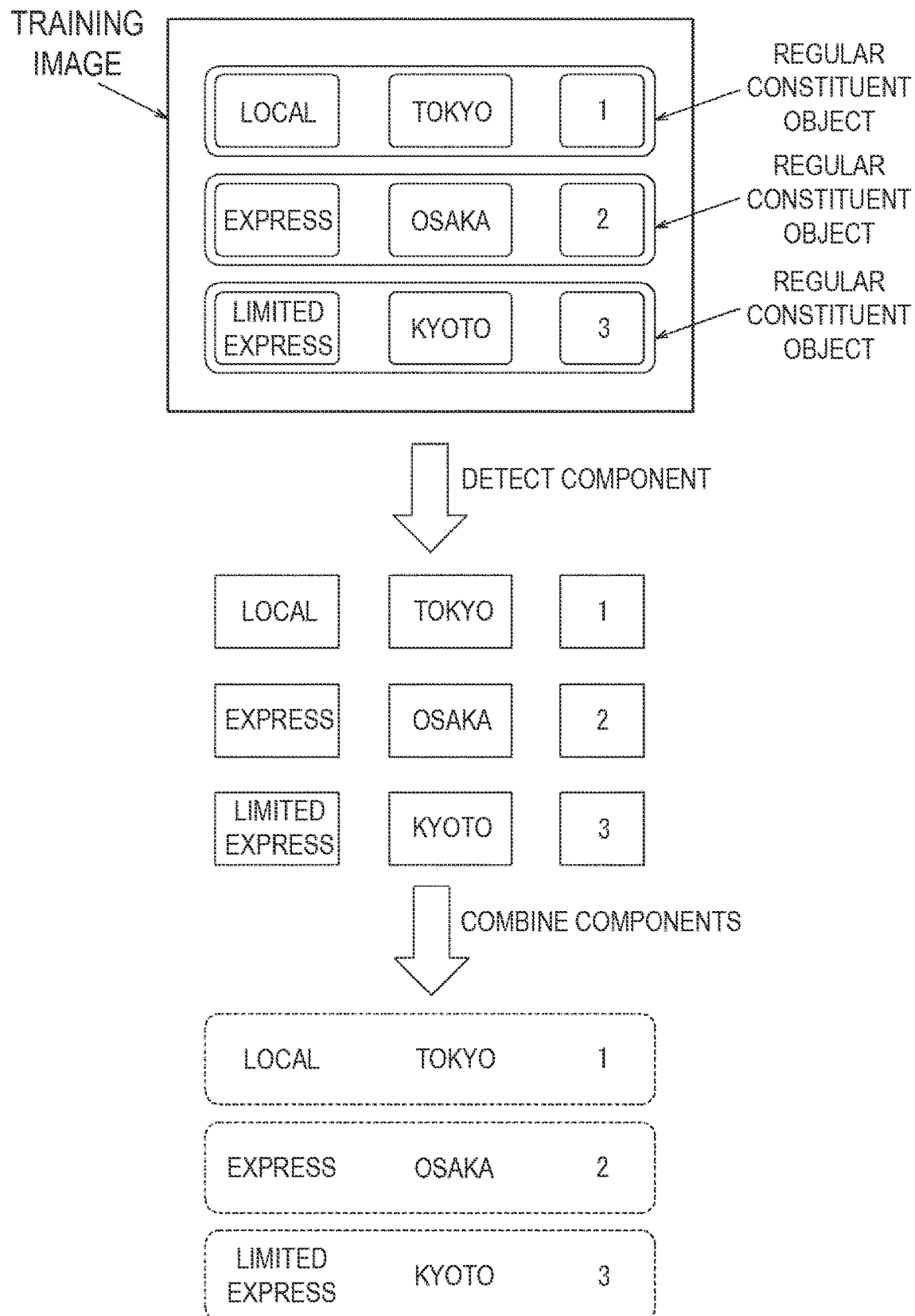
FIG. 21 is a diagram illustrating an example of a first object recognition method of related art.
Figure 22:
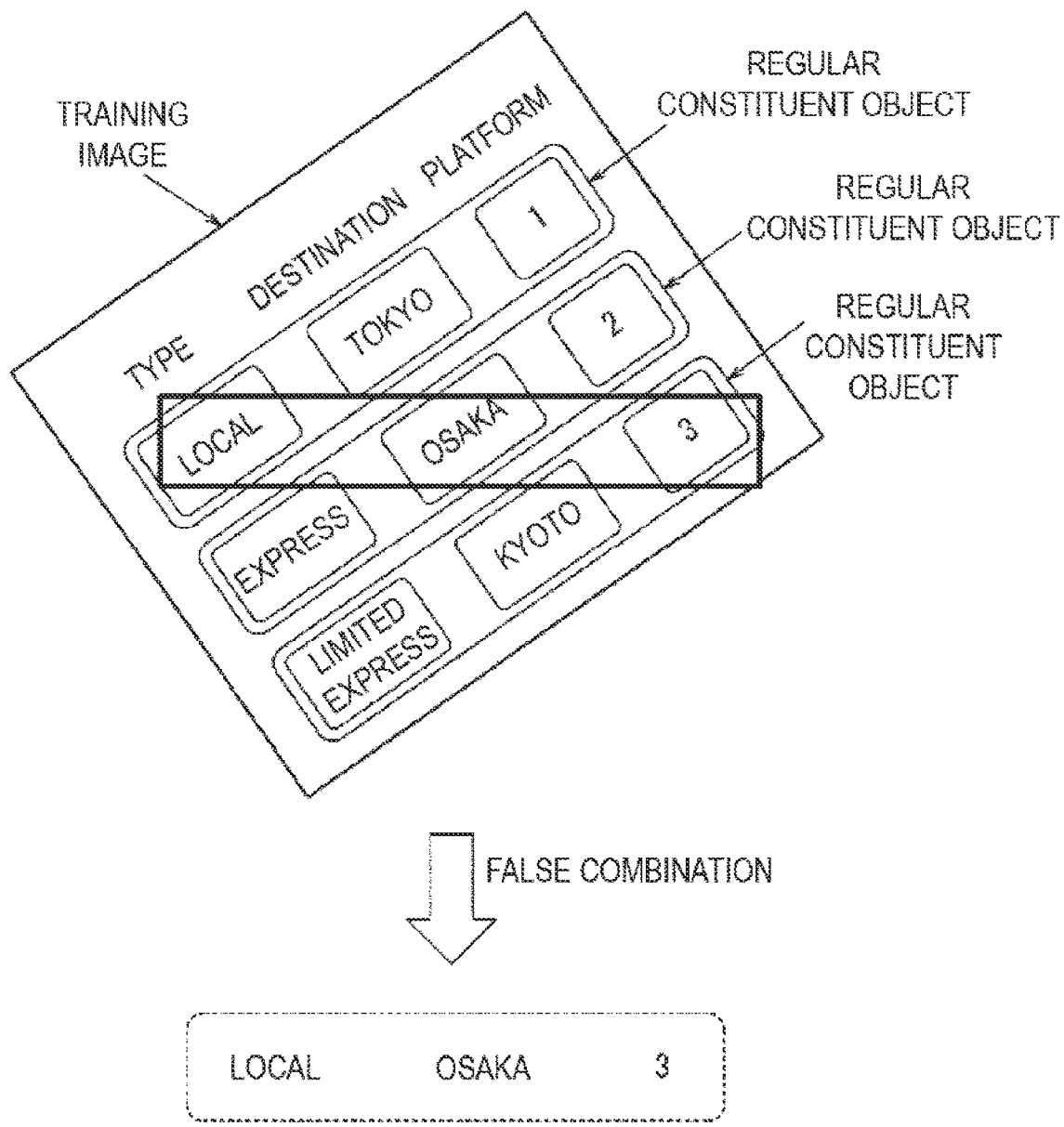
FIG. 22 is a diagram illustrating a problem of the first object recognition method of related art.
Figure 23:
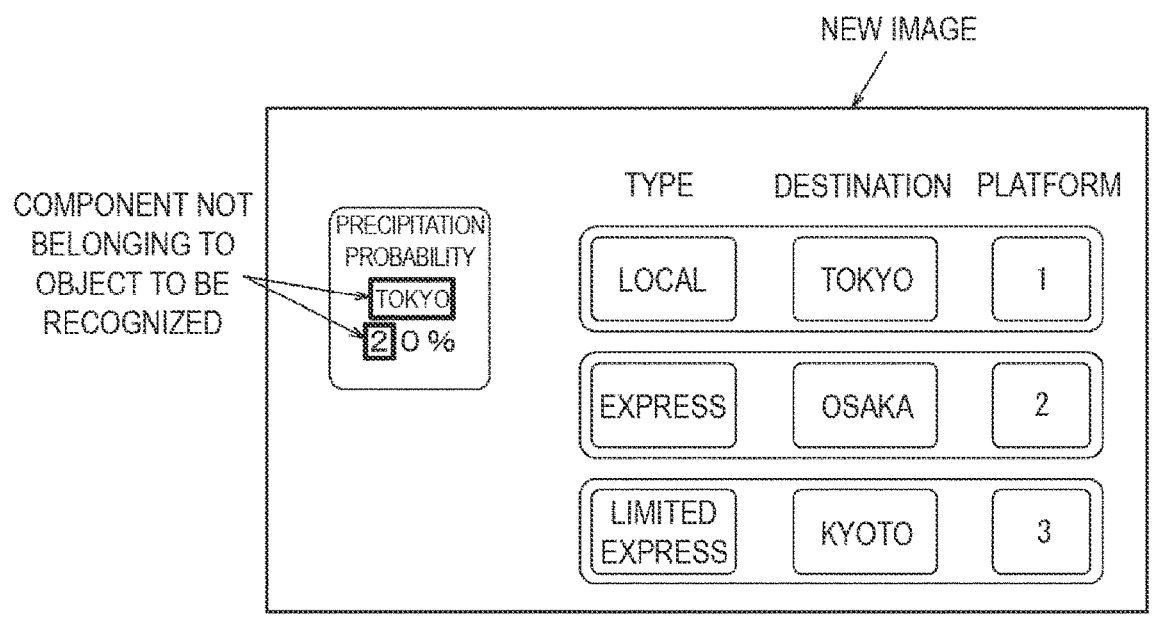
FIG. 23 is a diagram illustrating a problem of the first object recognition method of related art.

Next, the learning method according to the present embodiment will be described with reference to FIG. 13. FIG. 13 is a flowchart illustrating an example of the learning method.

In step S201, the input unit 10 acquires a new image, a primary component adoption threshold $V_{th1}$, a candidate creation threshold $V_{th2}$, a candidate adoption threshold $V_{th3}$, a candidate merge threshold $V_{th4}$, and a secondary component selection threshold $V_{th5}$, and inputs the acquires to the constituent component detection unit 20, the bottom-up estimation unit 50, the primary component merge unit 60, and the top-down recognition unit 70.

In step S202, the constituent component detection unit 20 uses the detection model learned by the learning apparatus 100 based on the new image 210 to detect coordinates of a region of a primary component contained in the new image 210, a label of the primary component contained in the new image 210, and a score of the primary component contained in the new image 210, and coordinates of a region of a secondary component contained in the new image 210, a label of the secondary component contained in the new image 210, and a score of the secondary component contained in the new image 210.

In step S203, the bottom-up estimation unit 50 refers to the constituent component detection result list, the constituent component model, the primary component adoption threshold $V_{th1}$, the candidate creation threshold $V_{th3}$, and the candidate adoption threshold $V_{th3}$ to estimate the first primary component candidates using Algorithm 2 illustrated in FIG. 10, for example.

In step S204, the primary component merge unit 60 refers to the first primary component candidate list and the candidate merge threshold $V_{th4}$ to merge the plurality of first primary component candidates using Algorithm 3 illustrated in FIG. 11, for example, and removes an unnecessary first primary component candidate.

In step S205, the top-down recognition unit 70 refers to the second primary component candidate list, the secondary component list, and the secondary component selection threshold $V_{th5}$ to select a secondary component matching the second primary component candidate from the secondary component list using Algorithm 4 illustrated in FIG. 12, for example, and registers the selected secondary component with the second primary component candidate.

According to the estimation method in the present embodiment, it is possible to recognize a regular constituent object with high accuracy without requiring a large amount of training data and without solving a combinatorial optimization problem for the all components.

Third Embodiment

Next, a learning apparatus 100A according to a third embodiment will be described.

The constituent component modeling unit 30 in the learning apparatus 100 according to the first embodiment calculates the tilts of the plurality of secondary components, based on the central coordinates of the regions of the secondary components belonging to the "type" and "platform" groups. In contrast, the learning apparatus 100A according to the third embodiment differs from the learning apparatus 100 according to the first embodiment in that a constituent component modeling unit 30A in the learning apparatus 100A according to the third embodiment calculates the tilts of the plurality of secondary components, based on the central coordinates of the regions of the secondary components belonging to the "type", "destination", and "platform" groups. Note that the other configuration is the same as the learning apparatus 100 according to the first embodiment, and thus, repeated descriptions thereof are omitted.

The constituent component modeling unit 30A uses Algorithm 5 illustrated in FIG. 14, for example, to calculate tilts of a plurality of secondary components contained in a prescribed regular constituent object by fitting a straight line to the central coordinates of the regions of all the secondary components contained in the prescribed regular constituent object, for all the regular constituent objects included in the regular constituent object list illustrated in Table 5. For example, for the regular constituent object indicated by 'NO. 1', the constituent component modeling unit 30 calculates tilts of the secondary component belonging to the "type" group, secondary component belonging to the "destination" group, and secondary component belonging to the "platform" group contained in the regular constituent object indicated by 'NO. 1', based on the central coordinates (0.32, 0.47) of the region of the secondary component belonging to the "type" group, the central coordinates (0.62, 0.47) of the region of the secondary component belonging to the "destination" group, and the central coordinates (0.86, 0.47) of the region of the secondary component belonging to the "platform" group.

According to the learning apparatus 100A in the third embodiment, appropriate learning can be performed without requiring a large amount of training data and without solving the combinatorial optimization problem for the all components. The accuracy of the constituent component model can be increased, and therefore, it is possible to recognize a regular constituent object with further higher accuracy.

Fourth Embodiment

Next, a learning apparatus 100B according to a fourth embodiment will be described.

The constituent component modeling unit 30 in the learning apparatus 100 according to the first embodiment equally divides the range of the tilts. In contrast, the learning apparatus 100B according to the fourth embodiment differs from the learning apparatus 100 according to the first embodiment in that a constituent component modeling unit 30B in the learning apparatus 100B according to the fourth embodiment does not equally divide the range the tilts. Note that the other configuration is the same as the learning apparatus 100 according to the first embodiment, and thus, repeated descriptions thereof are omitted.

Next, the constituent component modeling unit 30B uses Algorithm 6 illustrated in FIG. 15, for example, to divide values of the tilts into P clusters by k-means clustering, find an average in each cluster, and divide into P patterns, based on the tilts of the plurality of secondary components contained in a prescribed regular constituent object, for all the regular constituent objects included in the regular constituent object list illustrated in Table 5.

According to the learning apparatus 100B in the fourth embodiment, the learning method is realized that performs appropriate learning without requiring a large amount of training data and without solving the combinatorial optimization problem for the all components. The accuracy of the constituent component model can be increased, and therefore, it is possible to recognize a regular constituent object with further higher accuracy.

Fifth Embodiment

Next, a learning apparatus 100C according to a fifth embodiment will be described.

The constituent component modeling unit 30 in the learning apparatus 100 according to the first embodiment does not establish a neural network. In contrast, the learning apparatus 100C according to the fifth embodiment differs from the learning apparatus 100 according to the first embodiment in that a constituent component modeling unit 30C in the learning apparatus 100C according to the fifth embodiment establishes a neural network. Note that the other configuration is the same as the learning apparatus 100 according to the first embodiment, and thus, repeated descriptions thereof are omitted.

The constituent component modeling unit 30C establishes a neural network different from the detection model learned by the constituent component detection unit 20, and learns a constituent component model. For example, the constituent component model is a neural network into which input is a pair of coordinates and a label of a region of a secondary component contained in a regular constituent object, and from which output are coordinates of a region of a primary component contained in a prescribed regular constituent object, a label of the primary component, a score of the primary component, coordinates of regions of all secondary components contained in the prescribed regular constituent object, labels of the secondary components, and scores of the secondary components.

According to the learning apparatus 100C in the fifth embodiment, the learning method is realized that performs appropriate learning without requiring a large amount of training data and without solving the combinatorial optimization problem for the all components. The accuracy of the constituent component model can be increased, and therefore, it is possible to recognize a regular constituent object with further higher accuracy.

Sixth Embodiment

Next, an estimation apparatus 200A according to a sixth embodiment will be described.

The top-down recognition unit 70 in the estimation apparatus 200 according to the first embodiment calculates the matching ratio, based on the ratio at which a prescribed secondary component is contained in a prescribed primary component. In contrast, the estimation apparatus 200A according to the sixth embodiment differs from the estimation apparatus 200 according to the first embodiment in that a top-down recognition unit 70A in the estimation apparatus 200A according to the sixth embodiment calculates the matching ratio, based on the constituent pattern list (see Table 7). Note that the other configuration is the same as the estimation apparatus 200 according to the first embodiment, and thus, repeated descriptions thereof are omitted.

The top-down recognition unit 70A estimates, based on the constituent pattern list generated by the constituent component modeling unit 30, a position of a secondary component contained in a prescribed regular constituent object. The top-down recognition unit 70A uses Algorithm 7 illustrated in FIG. 16, for example, to calculate a matching ratio based on the position of the estimated secondary component and the position of the secondary component detected by the constituent component detection unit 20.

Then, the top-down recognition unit 70A determines whether or not the matching ratio is equal to or more than the secondary component selection threshold $V_{th5}$. The top-down recognition unit 70A selects a prescribed secondary component in the secondary component list illustrated in Table 13 and registers the selected secondary component with the second primary component candidate in a case that the matching ratio is equal to or more than the secondary component selection threshold $V_{th5}$. The top-down recognition unit 70 does not select any secondary component in a case that the matching ratio is less than the secondary component selection threshold $V_{th5}$.

According to the estimation apparatus 200A in the sixth embodiment, it is possible to recognize a regular constituent object with high accuracy without requiring a large amount of training data and without solving a combinatorial optimization problem for the all components. The accuracy of the matching ratio calculation can be increased, and therefore, it is possible to recognize a regular constituent object with further higher accuracy.

Modification Example

In the present embodiments, the learning apparatus 100 illustrated in FIG. 2 and the estimation apparatus 200 illustrated in FIG. 8 are illustrated and described separately, but the learning apparatus 100 and the estimation apparatus 200 may be integrally formed. Accordingly, the estimation apparatus 200 may include the respective units included in the learning apparatus 100.

In the present embodiments, a case that a destination indicator is applied as a regular constituent object is described as an example, but the regular constituent object is not limited to the destination indicator. Examples of the regular constituent object may include, for example, a destination sign for public transport, a road sign, a license number plate of a private passenger vehicle, a transmittal letter of parcel delivery service, a destination of a postal matter, and the like.

The estimation program, the estimation apparatus, the generating method of a detection model, the learning method, and the learning apparatus according to the present embodiments can be applied to various types of display devices, car navigation systems, smart phones, digital cameras, monitoring cameras, optical character readers, and the like. It goes without saying that the estimation program, the estimation apparatus, the generating method of a detection model, the learning method, and the learning apparatus according to the present embodiments can apply to various types of regular constituent objects different in various types of information in the constituent components.

Other Modifications

The present invention is not limited to the above embodiments and modification examples. For example, the various processes described above may be executed not only in chronological order as described but also in parallel or on an individual basis as necessary or depending on the processing capabilities of the apparatuses that execute the processes. In addition, appropriate changes can be made without departing from the spirit of the present invention.

Program and Recording Medium

It is also possible to use a computer that can execute program instructions to function as the above-described embodiments and modification examples. The computer may be implemented by storing a program describing the processing contents for realizing the functions of each of the devices in a storage unit of the computer, and reading and executing the program by the processor of the computer, and at least a part of these processing contents may be realized in hardware. Here, examples of the computer may include a general purpose computer, a special purpose computer, a workstation, a PC, an electronic notepad, or the like. The program instructions may be program code, code segments, etc. to perform the required tasks. Examples of the processor may include a central processing unit (CPU), a graphic processing unit (GPU), a digital signal processor (DSP), an application specific integrated circuit (ASIC), and the like.

For example, a program causing a computer to execute the estimation method described above includes, with reference to FIG. 7 and FIG. 13, step S104 of acquiring a learned detection model and a constituent component model, input into the learned detection model including a new image, output from the learned detection model including coordinates of a region of a primary component contained in the new image, a label of the primary component, a score of the primary component, coordinates of a region of a secondary component contained in the new image, a label of the secondary component, and a score of the secondary component, the constituent component model being obtained by modeling a relationship between coordinates of a region of a primary component contained in a prescribed regular constituent object and coordinates of regions of a plurality of secondary components contained in the prescribed regular constituent object, step S202 of using the learned detection model to output, as constituent component detection results, the coordinates of the region of the primary component contained in the new image, the label of the primary component, the score of the primary component, the coordinates of the region of the secondary component contained in the new image, the label of the secondary component, and the score of the secondary component, based on the new image, step S203 of estimating a first primary component candidate, based on the constituent component model and the constituent component detection results and sorting out a secondary component that is not registered with the first primary component candidate, step S204 of merging a plurality of the first primary component candidates to generate a second primary component candidate, and step S205 of selecting a secondary component matching the second primary component candidate from among a plurality of the sorted out secondary components and registering the selected secondary component with the second primary component candidate.

The program may be recorded in a computer-readable recording medium. Use of such a recording medium makes it possible to install the program on a computer. Here, the recording medium on which the program is recorded may be a non-transitory recording medium. Examples of the non-transitory recording medium may include a compact disk (CD)-read-only memory (ROM), a digital versatile disc (DVD)-ROM, a Blu-ray Disc (BD)-ROM (trade name), or the like. The program may also be provided through download via a network.

The above embodiments have been described as representative examples, but it is apparent to those skilled in the art that many changes and substitutions are possible without departing from the spirit and scope of the present disclosure. Therefore, the present invention should not be construed as being limited by the embodiment described above, and various modifications and changes can be made without departing from the scope of the claims. For example, a plurality of constituent blocks described in the configuration diagrams of the embodiments can be combined into one or one constituent block can be divided. A plurality of processes described in the flowchart of the embodiment may be combined into one process, or one process may be divided.

REFERENCE SIGNS LIST

10 Input unit
20 Constituent component detection unit
21 Training image
22_1, 22_1, 22_3 Regular constituent object
23 Primary component
24_1, 24_1, 24_3 Secondary component
30, 30A, 30B, 30C Constituent component modeling unit
40 Storage unit
50 Bottom-up estimation unit
60 Primary component merge unit
70, 70A Top-down recognition unit
80 Output unit
100, 100A, 100B, 100C Learning apparatus
200, 200A Estimation apparatus
210 New image
220_1, 220_1, 220_3 Regular constituent object
230 Primary component
240_1, 240_1, 240_3 Secondary component
260 Non-regular constituent object

The invention claimed is:

1. A non-transitory computer-readable medium recording an estimation program that, when executed by a computer, causes the computer to perform a method comprising:
   acquiring
      a learned detection model that receives a new image as input to output coordinates of a region of a primary component contained in the new image, a label of the primary component, a score of the primary component, coordinates of a region of a secondary component contained in the new image, a label of the secondary component, and a score of the secondary component, and
      a constituent component model in which a relationship between coordinates of a region of a primary component contained in a prescribed regular constituent object and coordinates of regions of a plurality of secondary components contained in the prescribed regular constituent object are modeled;
   outputting the coordinates of the region of the primary component contained in the new image, the label of the primary component, the score of the primary component, the coordinates of the region of the secondary component contained in the new image, the label of the secondary component, and the score of the secondary component as constituent component detection results based on the new image by using the learned detection model;
   estimating first primary component candidates based on the constituent component model and the constituent component detection results and sorting out a secondary component that is not registered with a list of the first primary component candidates;
   merging a plurality of the first primary component candidates to generate a second primary component candidate; and
   selecting a secondary primary component matching the secondary primary component candidate from among a plurality of secondary components sorted out and registering the selected secondary component with the second primary component candidate.

2. The non-transitory computer-readable medium according to claim 1, wherein the label of the primary component and the label of the secondary component include destination labels, type labels, and platform labels.

3. The non-transitory computer-readable medium according to claim 2, wherein the destination labels include city names, the type labels include one of local, express, and limited express, and the platform labels include a number of a platform.

4. The non-transitory computer-readable medium according to claim 1, wherein the learned detection model is formed by a neural network.

5. The non-transitory computer-readable medium according to claim 4, wherein the constituent component model is formed by a neural network that is different from the neural network that forms the learned detection model.

6. The non-transitory computer-readable medium according to claim 1, wherein the coordinates of the region of the primary component and the coordinates of the region of the secondary component are given by x and y coordinates of a central point and height and width of a corresponding circumscribed rectangle.

7. An estimation apparatus comprising:
processing circuitry configured to
store
a learned detection model that receives a new image as input to output coordinates of a region of a primary component contained in the new image, a label of the primary component, a score of the primary component, coordinates of a region of a secondary component contained in the new image, a label of the secondary component, and a score of the secondary component, and
a constituent component model in which a relationship between coordinates of a region of a primary component contained in a prescribed regular constituent object and coordinates of regions of a plurality of secondary components contained in the prescribed regular constituent object are modeled;
output the coordinates of the region of the primary component contained in the new image, the label of the primary component, the score of the primary component, the coordinates of the region of the secondary component contained in the new image, the label of the secondary component, and the score of the secondary component based on the new image as constituent component detection results by using the learned detection model;
estimate first primary component candidates, based on the constituent component model and the constituent component detection results and sorting out a secondary component that is not registered with a list of the first primary component candidates;
merge a plurality of the first primary component candidates to generate a second primary component candidate; and
select a secondary component matching the secondary component candidate from among a plurality of secondary components sorted out and register the selected secondary component with the primary component candidate.

8. The estimation apparatus according to claim 7, wherein the label of the primary component and the label of the secondary component include destination labels, type labels, and platform labels.

9. The estimation apparatus according to claim 8, wherein the destination labels include city names, the type labels include one of local, express, and limited express, and the platform labels include a number of a platform.

10. The estimation apparatus according to claim 7, wherein the learned detection model is formed by a neural network.

11. The estimation apparatus according to claim 10, wherein the constituent component model is formed by a neural network that is different from the neural network that forms the learned detection model.

12. The estimation apparatus according to claim 7, wherein the coordinates of the region of the primary component and the coordinates of the region of the secondary component are given by x and y coordinates of a central point and height and width of a corresponding circumscribed rectangle.

13. An estimation method comprising:
acquiring
a learned detection model that receives a new image as input to output coordinates of a region of a primary component contained in the new image, a label of the primary component, a score of the primary component, coordinates of a region of a secondary component contained in the new image, a label of the secondary component, and a score of the secondary component, and
a constituent component model in which a relationship between coordinates of a region of a primary component contained in a prescribed regular constituent object and coordinates of regions of a plurality of secondary components contained in the prescribed regular constituent object are modeled;
outputting the coordinates of the region of the primary component contained in the new image, the label of the primary component, the score of the primary component, the coordinates of the region of the secondary component contained in the new image, the label of the secondary component, and the score of the secondary component as constituent component detection results based on the new image by using the learned detection model;
estimating first primary component candidates based on the constituent component model and the constituent component detection results and sorting out a secondary component that is not registered with a list of the first primary component candidates;
merging a plurality of the first primary component candidates to generate a second primary component candidate; and
selecting a secondary primary component matching the secondary primary component candidate from among a plurality of secondary components sorted out and registering the selected secondary component with the second primary component candidate.

14. The estimation method according to claim 13, wherein the label of the primary component and the label of the secondary component include destination labels, type labels, and platform labels.

15. The estimation method according to claim 14, wherein the destination labels include city names, the type labels include one of local, express, and limited express, and the platform labels include a number of a platform.

16. The estimation method according to claim 13, wherein the learned detection model is formed by a neural network.

17. The estimation method according to claim 16, wherein the constituent component model is formed by a neural network that is different from the neural network that forms the learned detection model.

18. The estimation apparatus according to claim 13, wherein the coordinates of the region of the primary component and the coordinates of the region of the secondary component are given by x and y coordinates of a central point and height and width of a corresponding circumscribed rectangle.

* * * * *